United States Patent
Young et al.

(10) Patent No.: US 7,042,892 B2
(45) Date of Patent: May 9, 2006

(54) VOICE-OVER IP COMMUNICATION WITHOUT ECHO CANCELLATION

(75) Inventors: Valerie Jo Young, Gaston, OR (US); William R. Kerr, Beaverton, OR (US); Myron H. White, Hillsboro, OR (US); Venkataraman Prasannan, Portland, OR (US)

(73) Assignee: RadiSys Corporation, Hillsboro, OR (US)

( * ) Notice: Subject to any disclaimer, the term of this patent is extended or adjusted under 35 U.S.C. 154(b) by 846 days.

(21) Appl. No.: 09/872,478

(22) Filed: Jun. 1, 2001

(65) Prior Publication Data

US 2002/0034194 A1    Mar. 21, 2002

Related U.S. Application Data

(60) Provisional application No. 60/209,169, filed on Jun. 2, 2000.

(51) Int. Cl.
*H04L 12/28* (2006.01)

(52) U.S. Cl. .................. 370/419; 370/366; 370/420; 370/463; 370/465; 370/466; 370/469; 370/470; 370/474; 370/476

(58) Field of Classification Search ............... 370/285, 370/401, 434, 463, 535, 375, 376, 366, 229, 370/419, 420, 465, 466, 469, 470, 474, 476
See application file for complete search history.

(56) References Cited

U.S. PATENT DOCUMENTS

| 5,307,345 | A | * | 4/1994 | Lozowick et al. | 370/428 |
|---|---|---|---|---|---|
| 5,533,018 | A | | 7/1996 | DeJager et al. | 370/60.1 |
| 5,796,733 | A | * | 8/1998 | Norris | 370/366 |
| 5,867,496 | A | | 2/1999 | Peres et al. | 370/376 |
| 5,999,539 | A | | 12/1999 | Dashiff et al. | 370/465 |
| 6,005,873 | A | | 12/1999 | Amit | 370/494 |
| 6,044,080 | A | | 3/2000 | Antonov | 370/401 |
| 6,058,117 | A | | 5/2000 | Ennamorato et al. | 370/442 |
| 6,067,296 | A | | 5/2000 | Heering et al. | 370/363 |
| 6,072,783 | A | * | 6/2000 | Riley | 370/294 |
| 6,195,359 | B1 | | 2/2001 | Eng et al. | 370/401 |
| 6,341,313 | B1 | * | 1/2002 | Kanoh | 709/227 |
| 6,522,648 | B1 | * | 2/2003 | Heering et al. | 370/363 |
| 6,625,116 | B1 | * | 9/2003 | Schneider et al. | 370/226 |
| 6,650,649 | B1 | * | 11/2003 | Muhammad et al. | 370/402 |
| 6,697,383 | B1 | * | 2/2004 | Li et al. | 370/510 |
| 6,760,333 | B1 | * | 7/2004 | Moody et al. | 370/395.1 |
| 6,826,187 | B1 | * | 11/2004 | Hey et al. | 370/395.6 |

FOREIGN PATENT DOCUMENTS

WO    WO 99/28827    6/1999

OTHER PUBLICATIONS

Dave Cassing, "C6x Solutions for Voice Over IP Gateway," pp. 74-85. Copyright 1998 *IEEE*.
Richard Crisp, "Direct Rambus Technology: The New Main Memory Standard," pp. 18-28. Copyright 1997 *IEEE*.

* cited by examiner

*Primary Examiner*—Dang Ton
*Assistant Examiner*—Jay P. Patel
(74) *Attorney, Agent, or Firm*—Stoel Rives LLP

(57) ABSTRACT

A highly flexible and scalable architecture implements TDM bridge and related functions for network to telecom interface applications like voice over Internet. A very small packet size minimizes packetization delay so that VOIP can be realized without expensive echo cancellation. High density enables processing 4K simultaneous voice channels in real time on a single, compact circuit board.

31 Claims, 20 Drawing Sheets

| RAM8 | RAM7 | RAM6 | RAM5 | RAM4 | RAM3 | RAM2 | RAM1 | RAM0 |
|---|---|---|---|---|---|---|---|---|
| Spare RAM Bank | Frame 7 \| Frame 7 | Frame 6 \| Frame 6 | Frame 5 \| Frame 5 | Frame 4 \| Frame 4 | Frame 3 \| Frame 3 | Frame 2 \| Frame 2 | Frame 1 \| Frame 1 | Frame 0 \| Frame 0 |
|  | HWY1 \| HWY0 | HWY1 \| HWY0 | HWY1 \| HWY0 | HWY1 \| HWY0 | HWY1 \| HWY0 | HWY1 \| HWY0 | HWY1 \| HWY0 | HWY1 \| HWY0 |

FIG. 18

VOICE-OVER IP COMMUNICATION WITHOUT ECHO CANCELLATION

RELATED APPLICATIONS

This application is a continuation of U.S. Provisional Application No. 60/209,169 filed Jun. 2, 2000; incorporated herein by reference.

TECHNICAL FIELD

This invention is in the field of network communications of digital data, voice, video and other content, and more specifically is directed to a flexible system architecture and methodologies for implementing a variety of network communications functionality at the confluence of computer networks and telecommunications technologies, such as voice-over-Internet ("VOIP").

BACKGROUND OF THE INVENTION

A wide variety of computer networking and telecommunications standards and protocols continues to evolve on both fronts even as telecommunication and computer networks converge. At the physical level, twisted pair, coax and other copper conductors are giving way to fiber optics, broadband wireless and other technologies. Over these various media and networks data is carried using a host of different protocols, from serial sampled streams to packets, cells, frames, etc. Some of the common protocols and access standards in use presently include SONET, ATM, Frame Relay and many others. Encapsulation further complicates the matter: we see, for example, encapsulation of LAN protocols over AAL5, classical IP over ATM, Frame Relay over ATM, etc. The promise of "VOIP" is becoming a practical reality at least over managed networks.

Transmitting and receiving digital "content" (fundamentally bits) carried in a particular data format and using a specified protocol over a selected type of link or connection, to another node where the corresponding stack is implemented is relatively straightforward, at least over a network or connection where delay can be controlled. Transitioning to different formats, protocols or physical links along the way is somewhat more complicated but bridges and gateways to accomplish such tasks are known. These transitions often require special synchronization, segmentation, buffering, packetizing, encapsulating, etc. (and generally undoing all of that at the destination node—stripping headers, etc.). "Bridging" thus imposes costs, both for equipment, and in the sense of processing overhead and delay. For some applications, especially voice applications, delay must be carefully controlled.

According to the ITU's voice delay guidelines, delays below 150 milliseconds (msec) are considered acceptable for most applications provided that echo cancellation is implemented. A total (one-way) delay of 35 msec is the maximum tolerable delay for acceptable quality of service (QOS) without echo cancellation. A significant part of the total delay is packetization. Packetization delay is caused by holding digital voice samples for placement in the payload until enough samples are collected to fill the packet or cell payload. In other words, it is the time necessary to accumulate enough data to build the packet payload. Echo cancellation is well known and can be implemented using DSP (digital signal processors) but such solutions add considerably to system cost and complexity. The need remains for a way to bridge various formats and protocols while minimizing delay and cost.

A related problem is that the growing variety of services and capabilities brings more communications requirements—to move voice, data, video, etc. at various (and ever increasing) speeds. Each new application requires a new hardware/software solution, meaning more equipment to design or buy, spares to stock, more potential points of failure, and more training for technicians on multiple pieces of equipment, all of which adds to the total cost of acquisition and ownership, particularly for makers and users of telecom equipment. Costs can be reduced by a single, versatile solution that accommodates a wide variety of protocols and applications. The need remains for a multi-access platform that consolidates most or all communications onto a single network backbone, leaving only one set of equipment to maintain, and one network management system to operate. The present invention can be used, for example, to seamlessly integrate voice, data, and video communications over fiber-optic, hybrid fiber/copper or microwave or other paths.

Density is another important consideration. Higher density—in terms of channels or calls per board or slot—translates to fewer circuit boards, hence fewer backplane slots, and smaller power supplies etc. in network/telecom equipment such a bridges, gateways and routers, be they customer premises or CO applications. All of these factors affect cost, performance and reliability. What is needed is a single board or SOC product that not only implements a substantial number of channels, for example 4k simultaneous voice channels; but also supports a variety of protocols and interfaces, fully provisionable under software control.

SUMMARY OF THE INVENTION

One aspect of the invention is a novel TDM bridge system for processing real time TDM data, such as sampled (digital) voice data, for transmission over a packet switched network with sufficiently low delay as to obviate the need for echo cancellation. The TDM bridge system is dynamically configurable under software/host control for interfacing to various media and protocols, such as Ethernet, ATM etc.

The present architecture can be configured to implement various types of bridges including ATM SARing (Segmentation And Reassembly) operations; TDM to TDM capabilities; Ethernet to Ethernet; ATM to SONET; IP to ATM; IP to SONET; TDM to packet over Sonet etc. Because particular protocols, packetization etc. are software provisionable, they can be changed dynamically with single-call granularity. For example, one group of TDM channels can be bridged to Ethernet, while other streams are bridged to ATM or IP over SONET. Thus, one product can replace what required several different hardware products in the prior art. In one embodiment, the present invention can be implemented on a single circuit board, such as a compact PCI board (cPCI) board, for convenient interfacing with other components of a communications system.

Another aspect of the invention includes a digital interface system for interfacing a network processor coupled to a parallel data bus so as to generate a continuous stream of serial TDM data. Such a system includes a parallel bus interface to receive bytes of parallel data from a connected network processor. By "bytes of parallel data" we mean two or more bytes transferred "broadside" in a single bus read or write operation. They are effectively concatenated. A specialized "transmit component" is coupled to the parallel bus interface for buffering and arranging the received bytes of parallel data so as to form a stream of serial TDM data. We arbitrarily define a transmit direction for the present description as generally packet-to-TDM; and conversely receive denotes a TDM-to-packet direction (whatever the particular physical interface or protocol). A TDM output port is provided for transmitting the stream of serial TDM data, the stream comprising a substantially continuous series of time-domain multiplexed time slots synchronized to a frame pulse signal, and each time slot corresponding to a respective virtual channel for carrying digital voice content.

More specifically, the transmit component includes a transmit memory for temporarily storing received data bytes received from the parallel bus. The transmit memory preferably is organized as at least two logical transmit memory banks, each transmit memory bank sized for storing a plurality of said data bytes for serialization into a frame of serial TDM data. For example, each bank can be 128 bytes long to buffer one frame of data. Further, each of the transmit memory banks is selectively configurable as either an "active" memory bank, available for unloading stored data bytes, or as a "non-active" memory bank available for storing data bytes as they are received from the parallel bus interface. These designations change continually in a "round-robin" type of protocol as data flows through the device. Thus the transmit component includes means for controlling the transmit memory so as to store received data bytes into the non-active memory banks while concurrently transferring previously stored data bytes from an active memory bank to a parallel-to-serial converter. The parallel-to-serial converter converts each buffered byte of data, in turn, into a corresponding time slot to form the TDM output data stream.

The parallel bus interface mentioned above is coupled to the transmit memory for storing multiple-byte data, for example four or eight bytes (64-bits) in a single, broadside write operation into multiple of the currently non-active memory banks. Each data byte is stored in a corresponding one of the non-active memory banks in natural order, so that a subsequent sequential read of a selected individual memory banks produces a series of bytes for serialization into a frame of TDM data.

A "receive component" implements a similar philosophy for the receive direction, i.e., for interfacing a continuous stream of serial TDM data to a network processor for subsequent packetization. The receive component is charged with buffering and assembling received TDM data so as to form bytes of parallel data and present them to the network processor without significant delay. The receive component includes a receive memory comprising a series of memory banks, including at least one "spare" bank for storing incoming data while previously buffered data is transferred in wide-word (parallel) read operations to the network processor. The transmit and receive components are part of an integrated Buffered Interface Component ("BIC"), realized as an FPGA or an ASIC in a present embodiment. The "BIC" also includes logic for directing the buffer memory operations and bus handshaking.

The network processor provides an interface to the host processor, employs RAM for packet processing, maintains active call tables, and provisions the BIC and a time slot interchange chip. The described architecture accommodates a wide variety of protocols and applications. It provides a "multi-access platform" that consolidates many communications requirements onto a single network backbone, leaving only one set of equipment to maintain, and one network management system to operate. The present invention can seamlessly integrate voice, data, and video communications over fiber-optic, hybrid fiber/copper or microwave or other paths.

Additional aspects and advantages of this invention will be apparent from the following detailed description of preferred embodiments thereof, which proceeds with reference to the accompanying drawings.

BRIEF DESCRIPTION OF THE DRAWINGS

FIG. 18 illustrates an example of memory organization of the receiver buffer memory of the interface system of FIG. 15.

DETAILED DESCRIPTION OF PREFERRED EMBODIMENT

Background—TDM Data Streams

Figure 1:
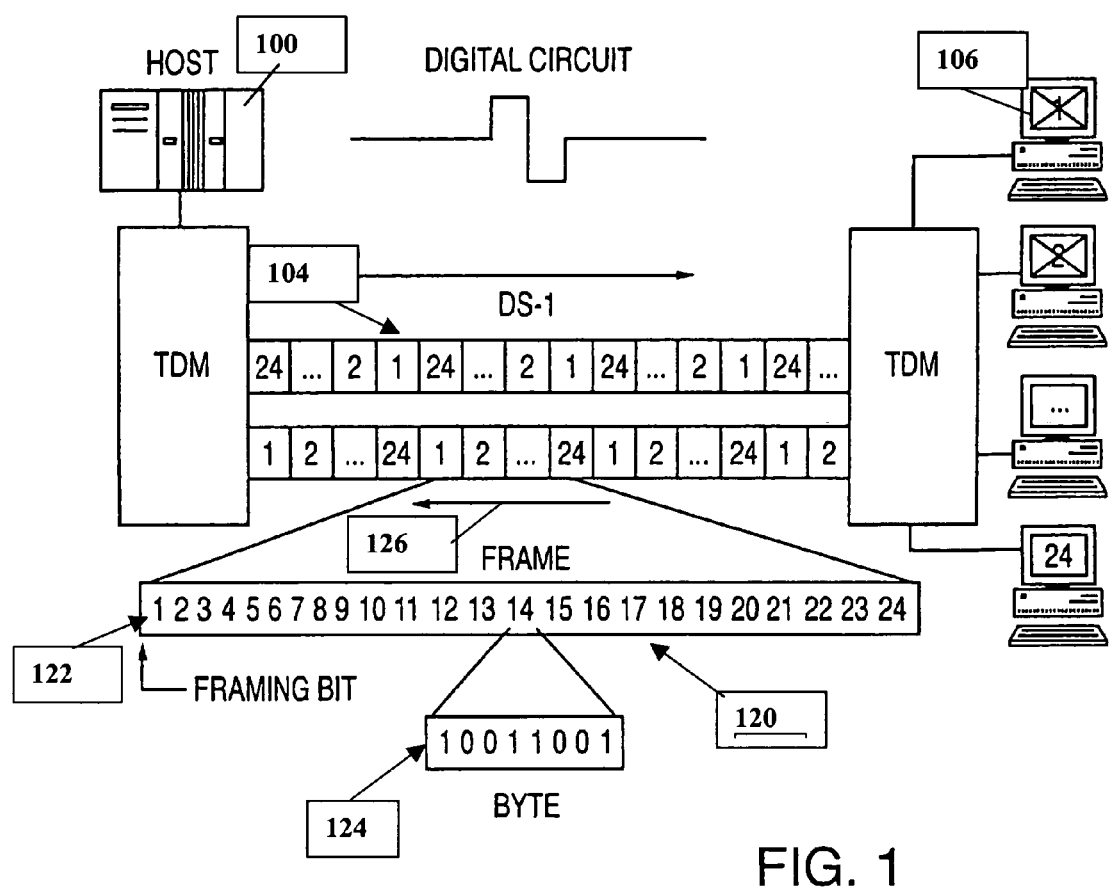
FIG. 1 is a conceptual diagram illustrating a generic time-domain multiplexed (TDM) digital voice data stream in a channelized T-1 circuit (prior art).

FIG. 1 is a conceptual illustration of a known time-division multiplexing (TDM) circuit for transmitting data communications from a first host (100) of a digital circuit to a receiving terminal (106). In a typical configuration, the TDM circuit implements 24 logical channels. Specifically, a continuous "stream" of digital data (104) is time-multiplexed so that a predetermined portion of each "frame" is allocated to each one of 24 sequential "time slots". In FIG. 1, an individual frame (120) illustrates the 24 time slots. Each frame begins with a framing bit (122) which is used to provide synchronization. Each time slot comprises one byte or octet of data. In this illustration, time slot 14 is shown as comprising a byte (124). The TDM stream (104) provides data in the transmit direction, defined as left to right in this figure. A similar TDM stream carries data in the opposite or receive direction indicated by arrow (126). At the receiving node (106), circuitry is deployed to separate or recover the individual channels (1–24) and route them to various destination nodes, illustrated by PCs (108) and (110).

"T-carrier" is a well-known, dedicated, digital, typically leased-line service that employs time-division multiplexing in order to derive multiple channels from a single four-wire circuit operating in full duplex transmission mode. This service offers the advantages of digital error performance, increased bandwidth, and improved bandwidth utilization. T-carrier is medium independent; in other words, it can be provisioned over various transmission media such as twisted pair, coax, microwave, infrared, or fiber optic cable—at least at the lower transmission rates of DS-0 and T-1. FIG. 1, described above, illustrates one implementation of a channelized T-1 circuit.

Figure 2:
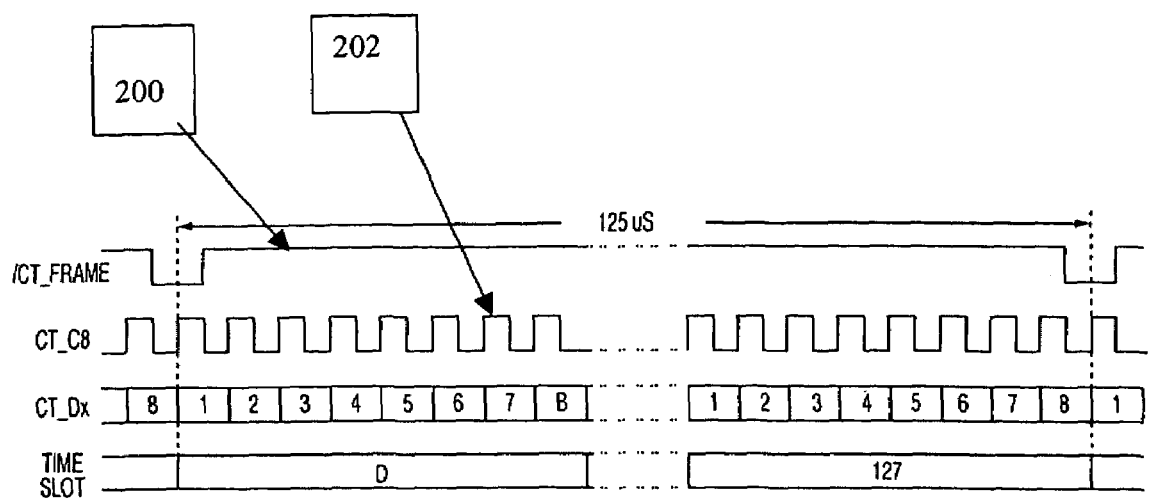
FIG. 2 is a timing diagram illustrating timing in accordance with the H.110 bus standard for carrying TDM or other sampled data.

FIG. 2 is a timing diagram illustrating operation of the H.110 bus, also referred to as the CT (Computer Telephony) bus. H.110 defines the H.100 standard as realized on the compact PCI (cPCI) bus. The main difference between H.100 and H.110 is that H.110 supports compact PCI hot swap. There are four classes of signals on the CT bus: core signals, compatibility signals, optional signals, and reserve signals. The core signals include /CT_FRAME_A frame sync. This is a negative true pulse, nominally 122 nsec wide that straddles the beginning of the first bit of the first time slot. CT_FRAME_A provides the TDM frame sync signal; it has a period of 125 microseconds.

Referring to FIG. 2, the first waveform (200) illustrates the /CT_FRAME signal. The second signal in FIG. 2 labeled (202) illustrates the CT_C8 bit clock. This clock frequency is nominally 8.192 MHz. The duty cycle of this signal is nominally 50%. Next, FIG. 2 illustrates the serial data lines CT_Dx shown at (204). The serial data lines can be driven by any board in the system. However, only one board can drive a bus at any given time slot on each stream. We use the term "stream" herein to refer to the continuous stream of data that appears on a selected serial data line on the H.110 bus. Each signal (implementing a stream) contains 128 time slots per frame at the frequency of 8.192 MHz. These 32 streams collectively are referred to as the CT_D bus.

Last, in FIG. 2, a timing signal (210) illustrates time slots 0–127. As shown, each time slot comprises a single 8-bit data byte (204). Accordingly, each 125 microsecond long frame comprises 1024 bits. The first group or time slot following the frame sync is designated CT_Dx; TS0 (data stream x; time slot 0); the second 8 bit group is CT_Dx; TS1 (data stream x; time slot 1) and so on. In a voice application, one channel or phone call travels in an assigned time slot of a selected stream. Thus, the H.110 bus can carry a maximum of 32 times 128 time slots or 4096 simultaneous calls. However, since voice calls require full-duplex operation, each call takes two time slots, so the bus carries 2048 full-duplex calls. Standard digital line speeds—T Carrier and optical—are summarized in Table 1:

TABLE 1

Standard Digital Line Speeds-T Carrier and Optical.

| Copper Cable Based (T Carrier) | | |
|---|---|---|
| T1 | 1.5 Mb/s | 24 channels |
| T2 | 6 Mb/s | 96 channels |
| T3 | 45 Mb/s | 672 channels |
| Synchronous Optical Network (SONET) | | |
| OC1 | 51 Mb/s | ~800 channels |
| OC3 | 155 Mb/s | ~1,600 channels |
| OC12 | 622 Mb/s | ~6,400 channels |
| OC48 | 2.4 Gb/s | ~25,600 channels |

TDM Bridge Hardware Overview

Figure 3:
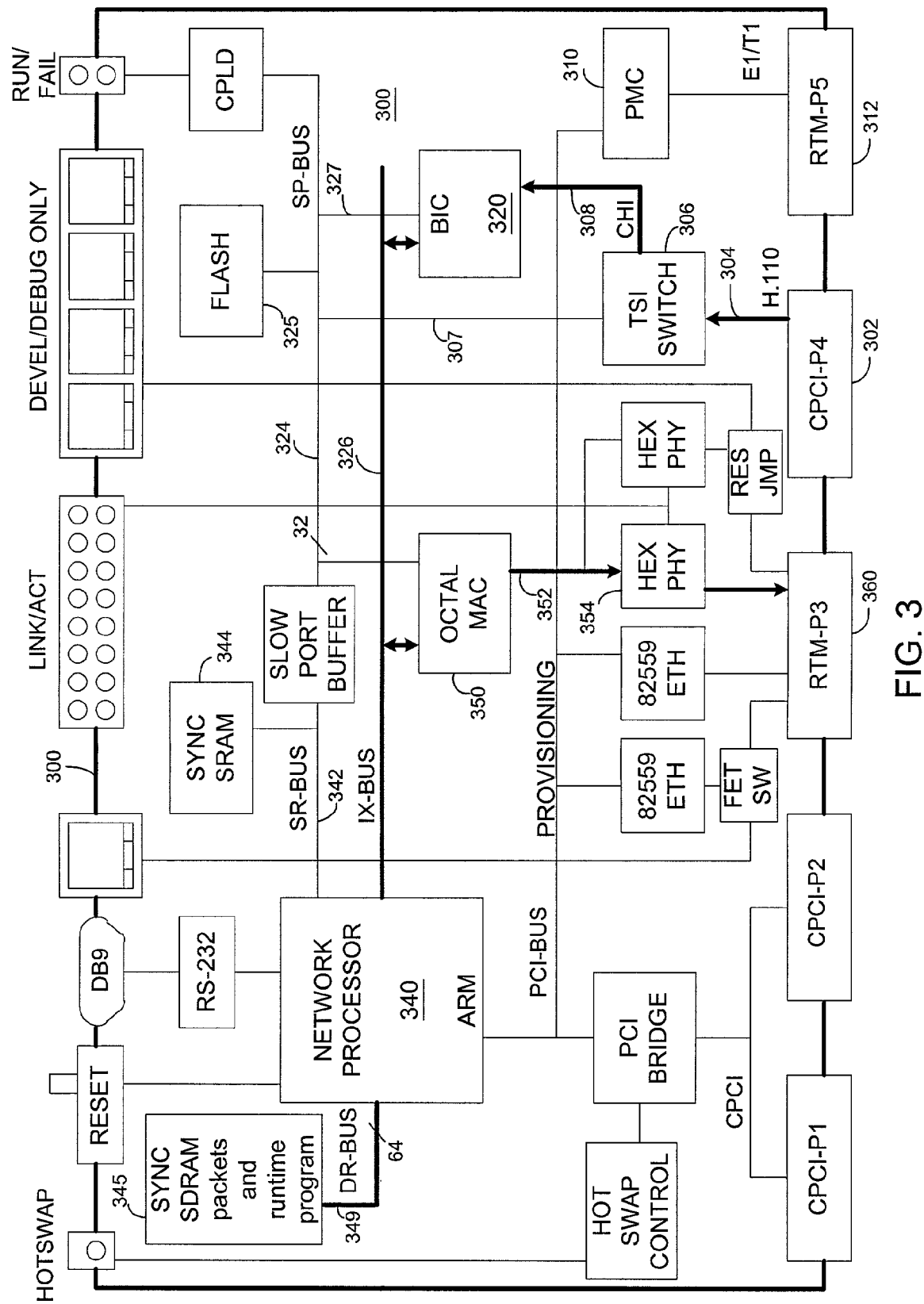
FIG. 3 is an architecture block diagram of a TDM bridge system according to the present invention.

FIG. 3 is an architectural block diagram of a "TDM bridge" system according to the present invention. It should be noted here that the invention can be used for many applications other than what would generally be called a TDM Bridge. Indeed, the present architecture is advantageous as a wide variety of different bridges can be implemented under software control. Bridge (or gateway) related applications of the present architecture include, for example:

ATM SARing capabilities
TDM to TDM capabilities
Ethernet to Ethernet capabilities
ATM<->SONET
IP<->ATM
IP<->SONET
TDM<->Packet over Sonet
MPEG<->IP or Ethernet or Sonet
Routing, multiplexing For now, we refer to the system of FIG. 3 as a TDM bridge as that application will be described to illustrate the architecture, features and operation of the invention. The basic data flow in a receive direction, i.e., from a TDM data stream to internet protocol (IP) packets, can be summarized as follows with reference to FIG. 3. A connector (302) such as a CPCI-P4 connector interfaces a circuit board (300) to an H.110 bus (not shown). In operation, the H.110 bus carries 32 parallel data streams of 128 TDM channels per stream as described above. The H.110 bus is connected over a parallel bus (304) to a time slot interchange (TSI) or "switch chip" (306). A suitable TSI is commercially available, for example the Ambassador T8105 time slot interchanger from Lucent Technologies. While that chip may not have sufficient bandwidth to handle all 32 streams today, newer versions and other similar devices undoubtedly will do so soon. The Lucent chip provides the bus interface signals needed for the H.110 bus. Local interfaces include 16 serial inputs and 16 serial outputs based on the Lucent concentration highway interface (CHI), shown in FIG. 3 at (308).

As noted, the H.110 bus carries 32 streams times 128 TDM channels, for a total of 4096 voice channels. All 32 streams on the H.110 bus are synchronized to a common frame pulse signal; the /CT_FRAME_A frame sync described above with regard to FIG. 2 (hereinafter referred to simply as the "frame pulse".) The frame pulse occurs every 125 msec. The TSI chip synchronizes to the frame pulse and can select and forward any designated stream, and any one or more individual voice channel (time slots) within that stream, to its outputs in essentially real time. Thus, the present TSI can select any or all of the 4K voice channels. The TSI is configured and time slots are selected dynamically via a microprocessor interface (307) further described later.

The TSI chip (306) outputs each selected time slot via the CHI bus (308) to a buffered interface component ("BIC") (320). CHI is a serial data interface consisting essentially of a data transport clock, a frame sync pulse, a data transmit and a data receive connection. Sixteen local data stream connections are defined in each direction. In general, in the receive direction, the BIC buffers data received on the CHI bus (308) and assembles the data for output to a network processor bus (326). We arbitrarily defined this as the receive direction. Conversely, the BIC provides a buffering and serialization process in the transmit direction as more fully described later. The BIC (320) is provisioned over a separate bus (the "slow-port" or "SP-bus" 324), separately from the data path in the illustrated embodiment. Different control and data bus arrangements can be employed as appropriate to interface with the selected network processor while achieving the same functionality. For development work, the BIC can be conveniently implemented as a field-programmable gate array (FPGA) integrated circuit. For production, it can be implemented as an ASIC. As technology progresses, many of the components on the TDM bridge board described herein can be expected to be further integrated into fewer—perhaps even a single—integrated circuit or SOC.

Data provided by the BIC (320) is input via a high-speed network processor bus ("IX-Bus") (326) to a network processor (340). One example of a suitable network processor is the IXP1200 network processor commercially available from Intel Corporation, Santa Clara, Calif. Another example is the IBM Power Network Processor network processor4GS3. The present description assumes use of the Intel part by way of illustration and not limitation. The network processor (340) is coupled via a memory bus (342) to a synchronous SRAM data store (344) and an SRAM buffer (346). The network processor assembles one or more bytes of data from each active voice channel (selected by the TSI) and encapsulates the data in accordance with a selected protocol such as the internet protocol. The packets are assembled in the synchronous SDRAM store 345. The resulting data packets are output via the IX bus (326) to an octal MAC (media access controller) (350), for example, as described in further detail below.

MAC refers to well-known IEEE specifications for the data link layer that define topology independent access control protocols. MAC is a media-specific access control protocol within IEEE specifications. For example, it includes variations for token ring, token bus and CSMA/CD. In this example, the MAC is used to control access to a shared medium such as an Ethernet connection. Octal MAC parts are commercially available off-the-shelf; one example currently is the IXF440 Dual-speed Multiport Ethernet MAC from Intel. The output from MAC 350 is coupled via link (352) to a HEX PHY (354) which, as the name implies, implements 16 channels (8 bits in each direction), providing transceivers for physical connection to a network such as Ethernet. HEX PHY transceivers are known and commercially available from various sources. One example is the Intel LXT974 four port PHY fast Ethernet transceivers which support IEEE 802.3 physical layer applications at 10 and 100 MBPS. Thus the MAC 350 and the HEX PHY 354 transmit the data packets to an Ethernet connection (360) such as an RJ-45. The RJ-45 connector may be part of a rear transition module ("RTM") in the presently preferred cPCI embodiment. This completes a brief overview of the present architecture and data flow from the H.110 connector (302) to the Ethernet connector (360) to implement a TDM bridge. This basic data path is shown in a heavy solid line in FIG. 3.

Time Slot Management

Figure 4:
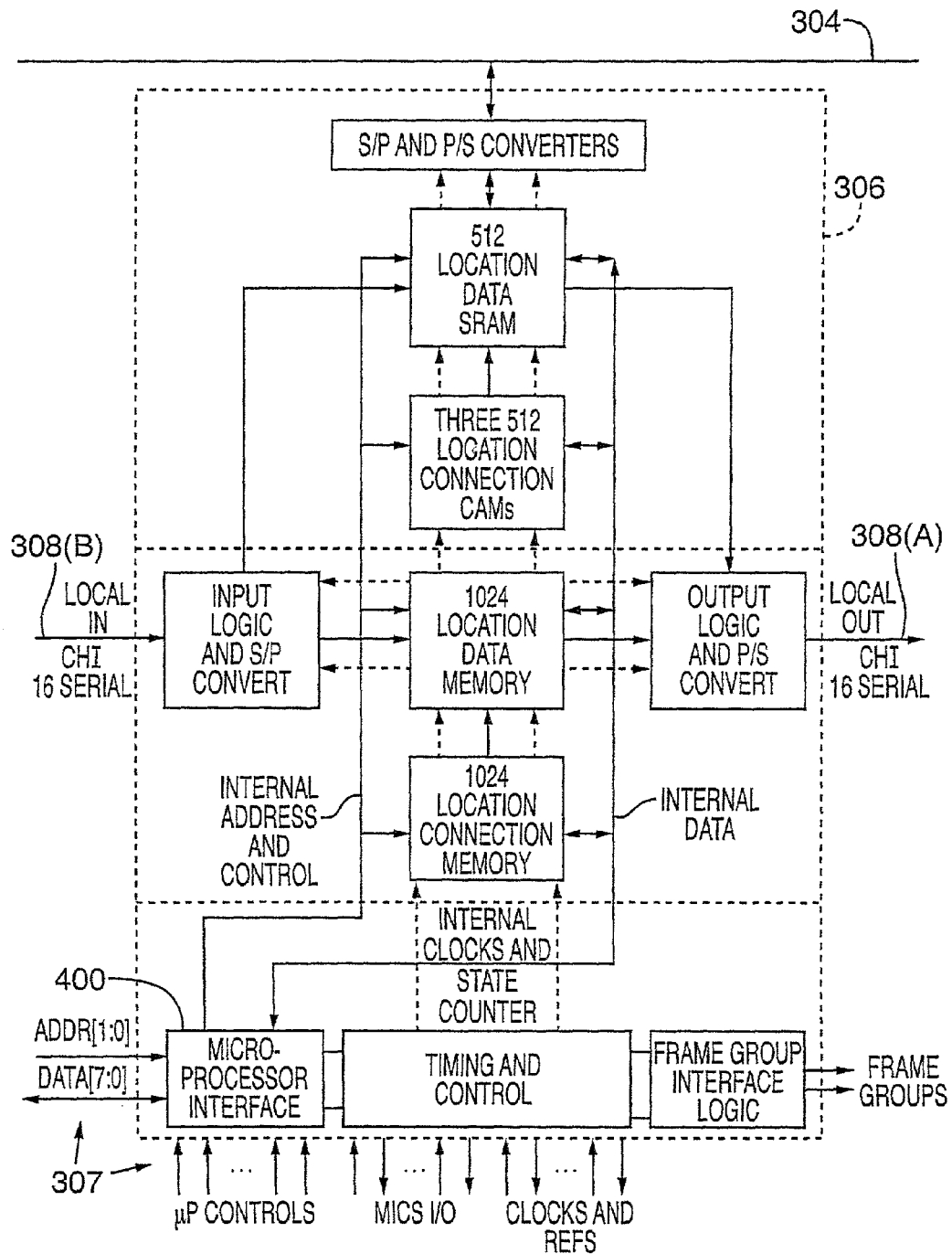
FIG. 4 illustrates a known time slot interchange chip.

FIG. 4 provides a more detailed illustration of the time slot interchange component (306). Referring to FIG. 4, the TSI (306) is connected to the H.110 bus (304), the latter carrying 32 data streams. In the transmit direction, the TSI (306) directs selected time slot data to the local or CHI bus (308A). CHI (Concentration Highway Interface), developed by AT&T for terminals and digital switches, is a full duplex TDM serial interface specification for voice transfers. It has four signal wires; clock, framing, receive data and transmit data.

Conversely, in the receive direction, the TSI (306) will receive time slot data on the CHI input bus (308 B). The selection of particular streams and channels (time slots) is configurable through a microprocessor interface (400). The microprocessor interface includes address, data and control signals, collectively identified by reference (307), which in turn is connected to the SP-bus (324) as shown in FIG. 3. Referring to FIG. 3, this bus is coupled to the network processor (340) in order to coordinate, on a dynamic basis, which voice channels are active. The network processor software maintains tables of active calls in its memory and provisions the TSI accordingly. For example, the network processor can maintain a table in internal memory indicating, for each active call, its source, destination and protocol. The network processor also keeps track of call sequencing.

Returning to FIG. 4, the TSI realizes selection of individual time slots by buffering data in internal SRAM and through the use of internal connection memory, which is configured via the microprocessor interface (400). The TSI also includes onboard clock circuitry (not shown), including a digital phase locked loop, which synchronizes to the H.110 bus clocks described above.

Recall that 32 streams of data are defined on the H.110 bus (304)—16 in and 16 out. Each stream is a continuous series of bits, divided into frames, with each frame beginning with a frame pulse and having a length of 125 msec. Each frame is further divided into 128 channels or time slots, each time slot consisting of an 8-bit byte of data. All 32 streams on the bus are synchronized to a single frame pulse. Thus, if we look at the first time slot following a frame pulse, call it channel one, the channel one time slot arrives in parallel (simultaneously) across all 16 streams. Then time slot two, another byte, arrives across all 16 streams, and so on. At the end of 125 msecs, when the next frame pulse arrives, all 128 time slots multiplied by 16 streams have arrived, for a total of 2K bytes, one byte for each of 2K voice channels. (And the same is true on the 16 outbound channels for full-duplex operation.) The TSI chip selectively routes the active time slot bytes to the local bus, while ignoring the time slots that are inactive. This data stream output from the TSI on the CHI bus (308) is input to the BIC chip (320) described next.

The Buffered Interface Chip (BIC)

Figure 15:
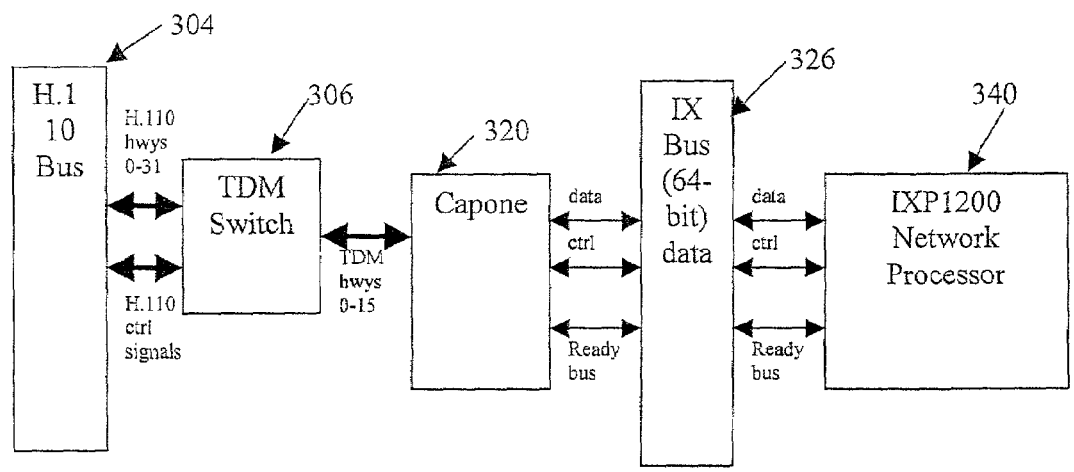
FIG. 15 is a system block diagram of a digital interface system for interfacing streams of time-slot data to and from a network processor bus.

FIG. 15 is a simplified block diagram of a system for interfacing TDM data on an H.110 bus (or any other medium) to a network processor. From left to right, the principal elements of the interface system are the H.110 bus (304) the TDM switch (TSI) (306), the BIC interface (320), the IX bus (326) and finally the network processor (340). This type of interface is necessary because a typical network processor bus transfers data in bursts of multiple accesses, for example 8 accesses, each access transferring multiple (e.g 64) bits of data in parallel. The network processor bus generally is most efficient when a large amount of data can be transferred at the same time. In burst mode, average read cycle times on the order of 15 nsec can be achieved. Since the local TSI sends and receives real-time serial data to and from a BIC, the BIC's function is to buffer data in both directions, allowing the network processor to transfer data in sets of numerous bursts. The number of bursts necessary per transfer is configurable in software. The BIC must accommodate continuous, real-time serial data flow on the TDM side, while simultaneously interfacing with the network processor bus as described.

Figure 16A:
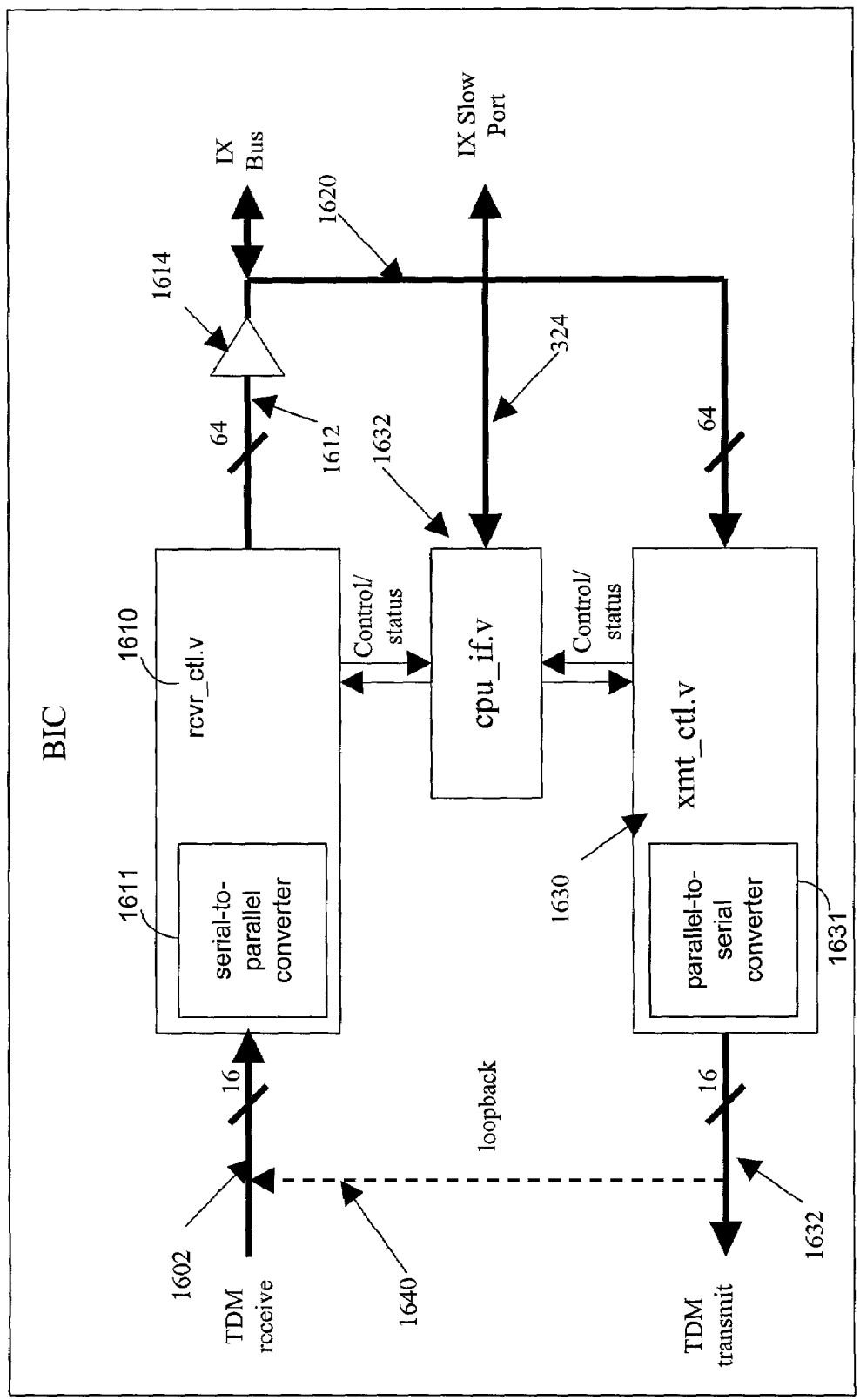
FIG. 16 is a simplified block diagram of a buffered interface chip ("BIC") of the present invention.

FIG. 16A is a high level block diagram of an illustrative BIC design, showing data flow generally rather than actual signal connections. In FIG. 16A, the major components of the BIC are an input bus (1602) coupled to a receiver buffer circuit (1610) which in turn is coupled via output bus (1612) and driver (1614) to the network processor or IX bus (1620). Bus 1620 also is coupled to a transmit buffer circuit (1630) which in turn outputs TDM transmit data on bus 1632. A CPU interface component (1632) is coupled to the IX slow port (324 in FIG. 3). As indicated, status and control signals are exchanged between the CPU interface (1632) and the receiver buffer (1610) as well as the transmit buffer (1630). The receiver buffer (1610) includes a serial to parallel converter and data storage memory as further described below. Conversely, the transmit buffer (1630) includes data storage memory as well as a parallel to serial converter. Finally, this block diagram illustrates the loop back path (1640) mentioned above.

Figure 5:
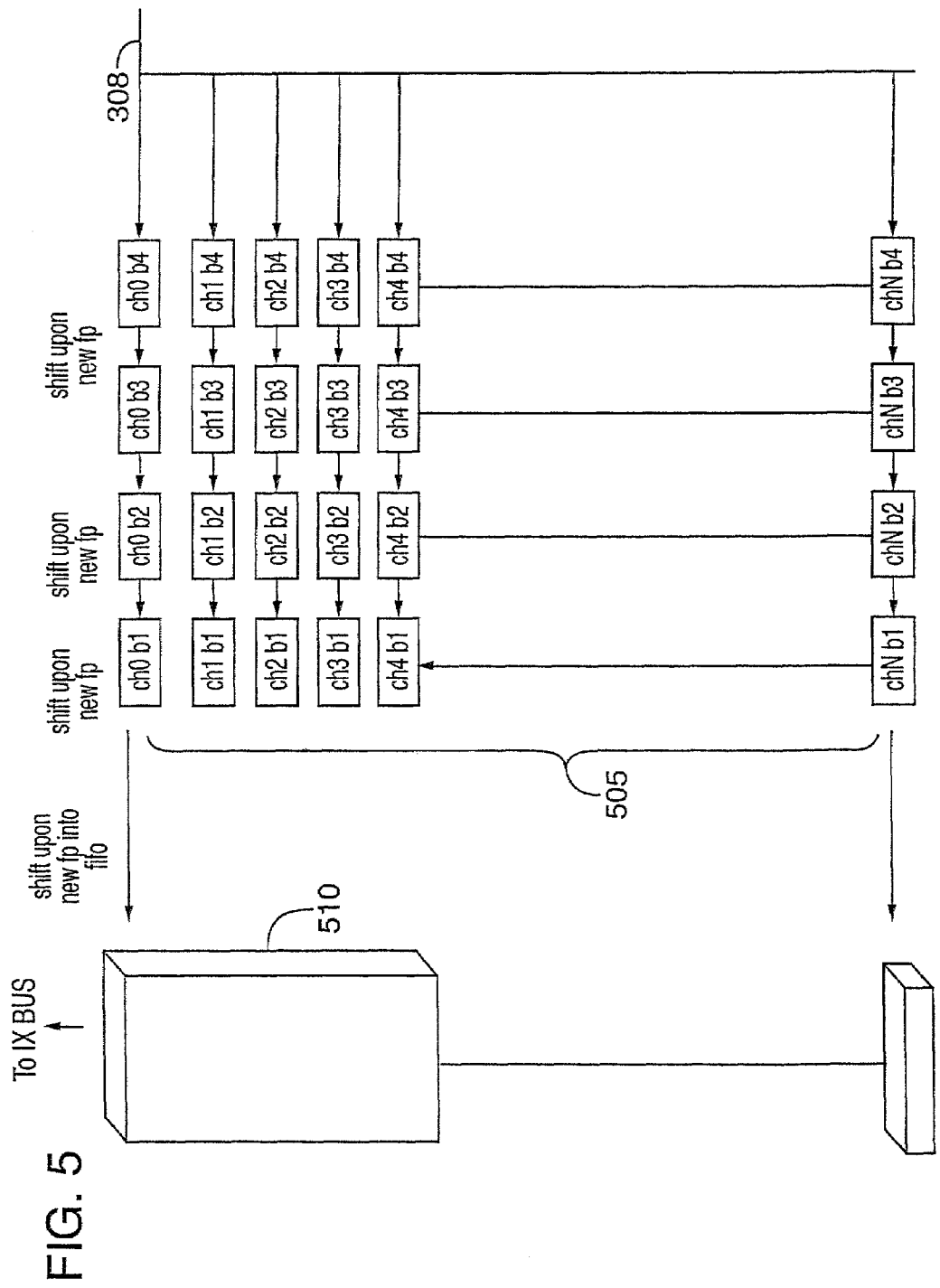
FIG. 5 is a diagram illustrating operation of the transmit component of a buffered interface component.

FIG. 5 is a conceptual diagram that illustrates buffering of data in the BIC device in the receive direction. The BIC is synchronized to the Tx frame pulse provided by the TSI (306) for data received on the H.110 bus (304). Referring to FIG. 5, the data is received at (308) and stored in a memory buffer. Specifically, a serial-to-parallel converter (1611 in FIG. 16A) "slices" bytes from the incoming serial data stream on time slot boundaries, based on the clocks described with reference to FIG. 2. The first byte received—channel 0, byte 1 ("ch0 b1") begins at a new frame pulse. Thus, ch0 b1 is followed immediately by ch1 b1, ch2 b1, ch3 b1, etc. This stream of bytes "b1" is indicated at 505 in the figure. The last byte, ch-N b1 is followed by a frame pulse to begin the next frame. ("N" equals 127 for a standard voice TDM stream.)

In response to the next frame pulse, the first byte b1 (for all 128 channels or time slots) are shifted into a RAM or FIFO memory (510). Then, the next frame ch0 b2, ch1 b2, ch2 b2 and so on flow into the memory, continuing until the end of that frame, 128 bytes later. At that point, the next frame pulse is received, and the second byte of data (for all 128 channels) is shifted into the FIFO. This process is ongoing continuously as data is clocked into the BIC chip. After a selected number of bytes (or frames) have been received, the data stored in the FIFO (510) is transmitted onto the IX bus (326 in FIG. 3) as further described shortly. In a presently preferred embodiment of a TDM bridge application, data is transmitted to the IX bus after 4 bytes are received (by 128 time slots), corresponding to a total of 0.5 msecs of voice content on each channel. This parameter is provisionable and can be adjusted under host control. Transferring the data after buffering 8 bytes per channel (i.e. 8 frames) is convenient as 8 bytes (64 bits) is the width of the network processor bus in this example. So the transfer is optimized in that regard. The BIC receives, stores and transmits every time slot, regardless of which time slots are active at any particular time. The network processor is aware of which time slots are active as noted above. FIG. 5 illustrates only one stream of TDM data for purposes of illustration; a minimum of two would be deployed in a practical application, one for transmit and one for receive.

Figure 11:
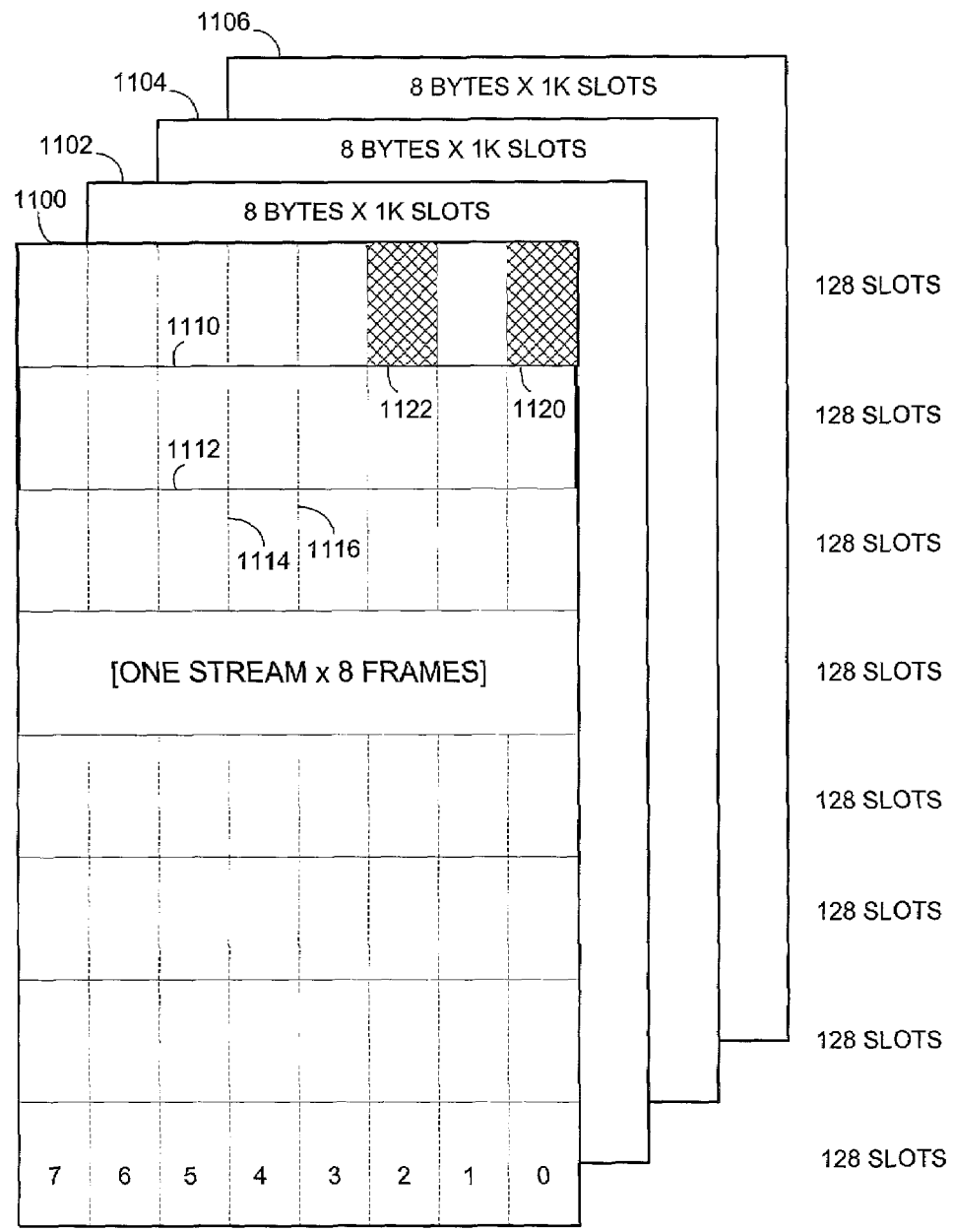
FIG. 11 is an illustrative memory configuration for a buffered interface component.
Figure 12:
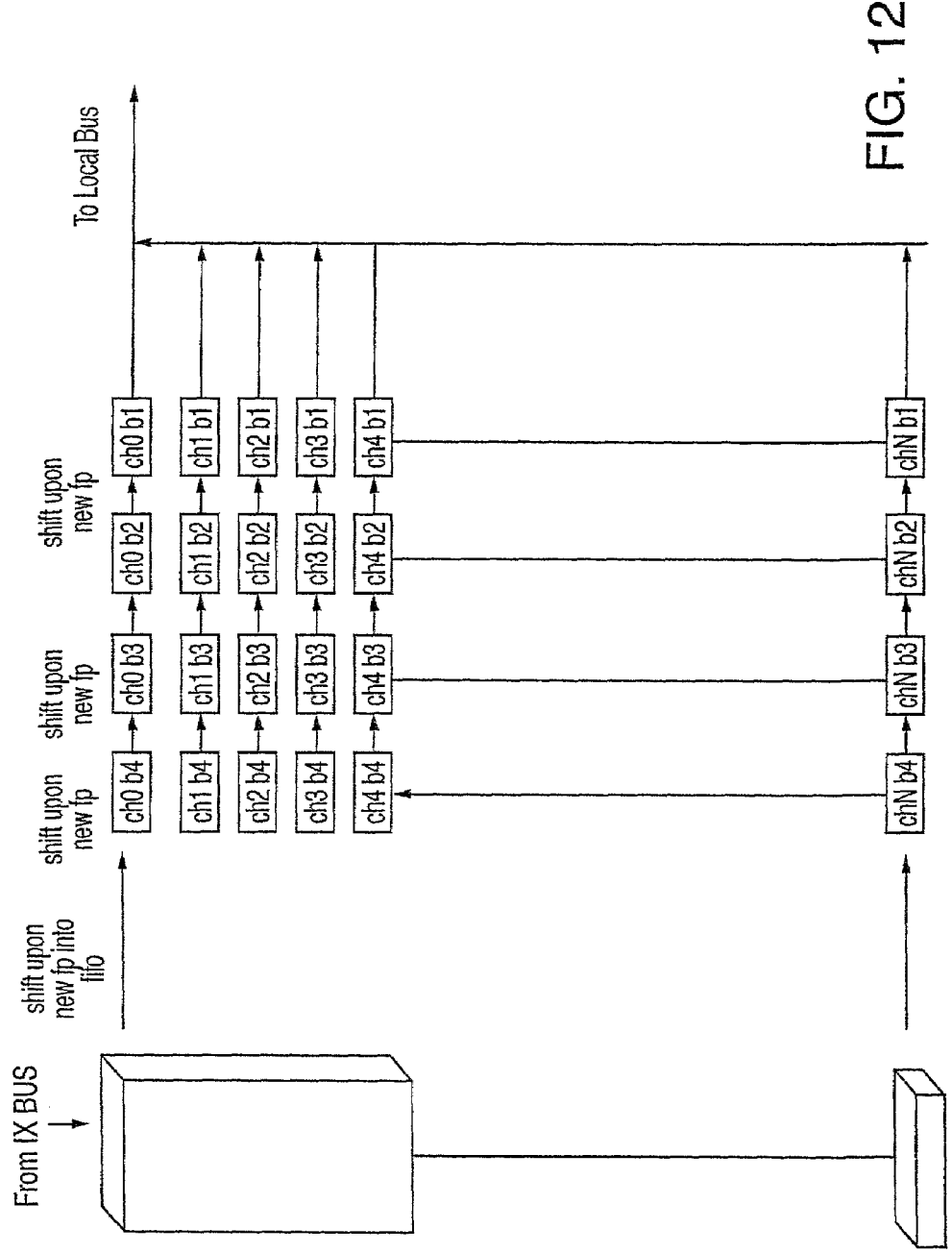
FIG. 12 is a diagram illustrating operation of the receive buffer of the BIC.

In a presently preferred commercial embodiment, the TDM bridge product accommodates a full H.110 bus, i.e. 16 full-duplex streams of voice data, within the timing constraints described. An illustrative memory map for buffering 16 streams is shown in FIG. 11. This memory would be implemented on board the BIG ASIC chip. In FIG. 11, a memory (1100) is eight bytes or 64 bits wide, the bytes being numbered 0 to 7 (right to left) at the bottom of the figure The byte boundaries are illustrated by dashed lines, for example boundaries (1114) and (1116) delineating byte 3. Each 128 rows is delineated by a horizontal line, e.g. (1110), corresponding to one stream of TDM data. Thus, box (1120) shows one TDM frame, i.e. one byte by 128 time slots. Memory 1100 is 1 K (1024) rows long, corresponding to eight streams. A second memory or page 1102 is similarly sized 8 bytes wide by 1K rows or time slots. Thus 16 streams of data can be buffered times 8 bytes or frames. Third and fourth memory pages (1104) and (1106) also are sized 8 bytes wide by 1 K rows. This additional memory can be used to buffer another port, such as the SONET port described with reference to FIG. 14, or can be used as working memory to "double buffer" bus transfers.

In a presently preferred embodiment the BIC is implemented as an ASIC; it supports 16 TDM streams or "highways" in each direction, buffering each time slot of all of the highways for 8 frames. The BIC operates in a 64-bit IX bus mode, enabling the transfer of 8 frames (i.e. 8 bytes of data) for a single time slot in one bus access. The BIC includes transmit count and receive count registers, for handshaking with the network processor, and allows the network processor software to monitor the locations of BIC buffer pointers. This information can be exchanged, referring to FIG. 3, over the slow port bus (324) employing a microprocessor type of interface 327 to the BIC.

The BIC further includes packet length registers to allow IX bus accesses to and from the BIC to be of configurable length. This feature gives software the ability to ignore all highways and time slots above a programmable level. A loop back mode for TDM data provides a functional TDM interface with minimal setup. (The loop back is illustrated in FIG. 16). Further, TDM data highway enable registers allow users to tri-state individual TDM input highways. Preferably, the BIC chip also includes a software reset bit in the control/status register (CSR 1668 in FIG. 16B) that allows software to reset the BIC to a predetermined power-up or default state. TDM data out will always repeat the value from the previous frame for every time slot in the frame whenever new data is not timely received from the IX bus. The amount of data required to avoid this mode of operation preferably is configurable. The presently preferred embodiment of the BIC is a flexible and scalable design that can accommodate up to 2048 full-duplexe time slots, with buffering up to 8 frames This arrangement enables the network processor to read TDM data in a natural 8-byte quad-word or "wide word," for transfers of 1 msec worth of data on each read cycle of the network processor bus. Of course, these specifications can be varied as available processors improve without departing from the principles of the invention.

What is key as noted at the outset is to avoid echo cancellation, which requires expensive DSP hardware and software. The BIC queues up 8 frames (or bytes) of data per time slot, which is 8×125 μsec or one millisecond of delay at this initial stage. Industry standards (and practical QOS) permit up to 35 milliseconds of total delay before echo cancellation is required. Eight bytes of data makes for a small packet, and hence the number of packets is large, but this traffic is accommodated by the present architecture within the echo time constraints as explained below.

BIC Receive Component Buffer Memory Operation

Figure 17:
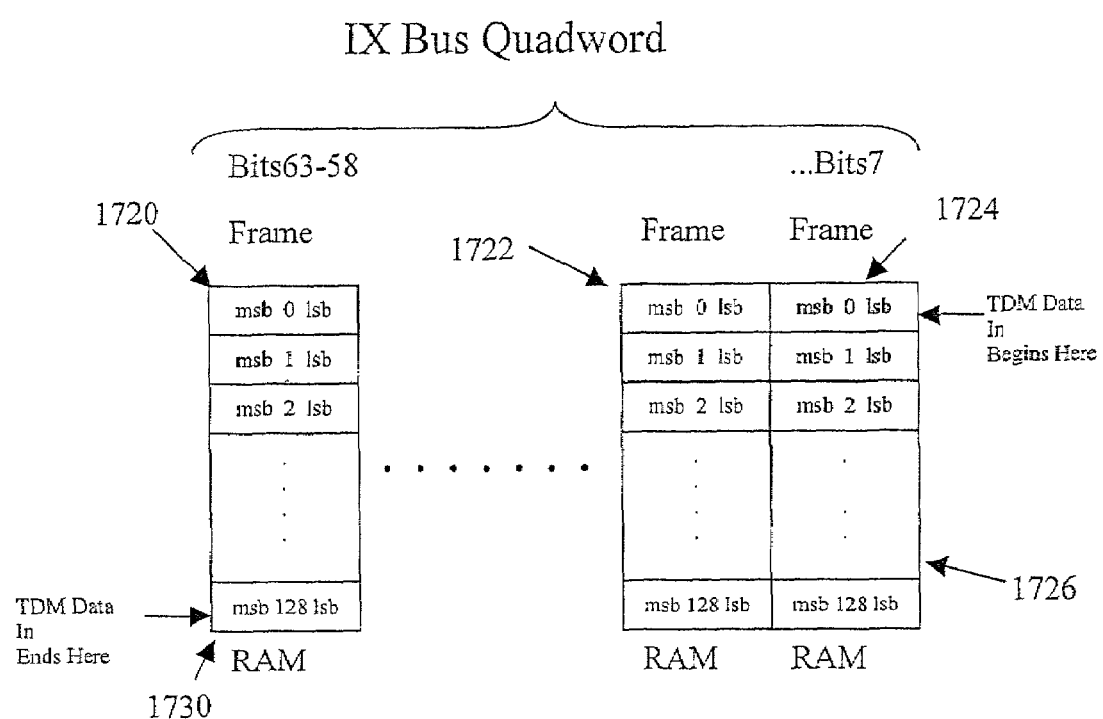
FIG. 17 illustrates in greater detail data flow into the receive component memory (RAM) in the interface system of FIG. 15.
Figure 19:
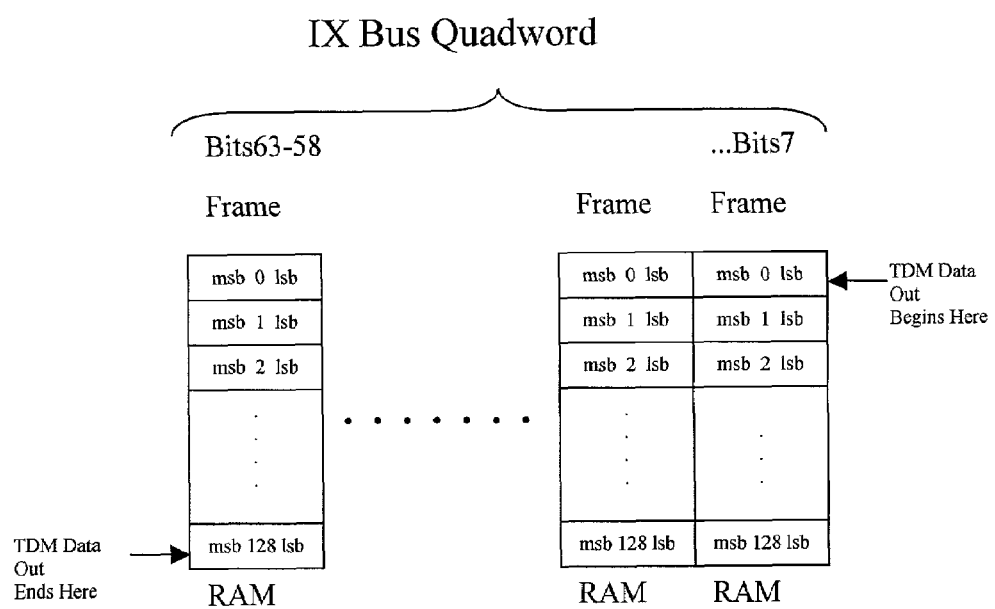
FIG. 19 illustrates in greater detail data flow out of transmit component memory (RAM) in the interface system of FIG. 15.

FIG. 17 illustrates data flow into a buffer memory of the BIC receiver component (1610 of FIG. 16A). Preferably, the buffer memory in this illustration is configured to present an effective parallel port having a width equal to the corresponding network processor data bus size, e.g. an "IX Bus Quad-word" as shown in the drawing. Each column of memory, e.g. columns 1720 and 1722, corresponds to one frame of data i.e., one byte wide by 128 time slots long. In this embodiment, there are eight columns of RAM representing eight frames (64 bits) of data.

In operation, TDM data entering the buffer is stored beginning with a first byte in the first RAM column on the right (1724); and continuing with storage of received data one byte at a time, from top to bottom, until the first frame is completed with byte (1726). (Recall that the serial TDM stream is converted to bytes of data by the serial-to-parallel converter 1611 of FIG. 16A.) Then, the next frame of memory (1722) is filled, again from top to bottom in the figure; and so on, proceeding from right to left in the drawing. This process is repeated until the last byte is written into memory location 1730 for a total of 8 frames.

Again it should be noted that the "receive" and "transmit" directions are handled by separate modules, as shown in FIG. 16A, for concurrent operation. Recall further that, in this description, we use the term "receive" to refer generally to a TDM-to-IXP data flow direction, and "transmit" will refer to IXP-to-TDM data flow. (However, data "received" in the BIC soon ends up in the network processor transmit buffer where it provides payload for subsequent transmission in packets, e.g. to an Ethenet port as described below.) Once 8 frames have been collected in the BIC receive buffer, the BIC receive component logic signals the network processor that data is available to be unloaded. In response, the network processor initiates a read sequence to unload all 8 frame buffers in parallel, time slot by time slot. This transfer process is described further below with reference to operation of the network processor.

It is critical, however, that the BIC buffer memory continue to receive and buffer incoming TDM data, even while it is unloading data to the network processor, as the TDM stream is ongoing in real time. This requirement can be achieved as follows. FIG. 18 shows more specifically an illustrative organization of memory in the receive buffer (1610). FIG. 18 illustrates 9 banks of memory, labeled RAM0 to RAM8. Each RAM bank (each storage element) is 16 bits or 2 bytes wide. Thus, in this module each of the nine RAM blocks can store two streams or highways, so the module can buffer up to 16 TDM highways 8 frames deep. Received voice data is read out of this module 8 bytes at a time, as described above, for each byte holds a different frame's representation of a particular time slot. Therefore, each 64 bit IX bus read contains one msec of voice data (125 msecs per frame times 8 frames) for that time slot.

In one embodiment, there are nine banks of RAM as shown in FIG. 18 even though only eight can be read one time. This leaves one bank of RAM always available for IX bus access while another RAM block is being filled with TDM data. This arrangement allows the network processor a period of 125 msecs to empty the entire receive RAM before overflow occurs, an helps eliminate the possibility of data corruption from multiple concurrent accesses.

In this configuration, when the data is read out, a highway toggle signal indicates which data (upper or lower byte) from a given RAM block is the "active" byte. In general, an active memory bank is available for storing incoming data, while the "inactive" or spare RAM back is available for transferring previously stored data bytes to the parallel bus interface. The designated "active" RAM bank is constantly revolving; as one fills up, the next one is made active. After 8 frames have been collected, a receive ready flag is asserted, and the data from the "non-active" banks is read out during the following network processor read access. The spare RAM bank then becomes active frame 0 during the next 8-frame cycle, and so on, rotating the active designation in "round robin" fashion. RAM in the receive module preferably has registered outputs, to improve timing constraints between RAM output and BIC output registers for IX bus data.

The receive and transmit modules (1610 and 1630 respectively, in FIG. 16A) can be synchronized when appropriate to simplify software operation. Specifically, when both modules are enabled at the same time, the receive module does not begin counting frames until after the first complete transmit transfer from the network processor. This synchronization step has two benefits: first, loopback mode will cause the same data that was written to the BIC to be read from the BIC 8 frames later. Second, the transmit ready signal will occur one frame before the received ready flag, thereby spreading out the network processor's burden across two frames. The CSR can be used to control various synchronization modes as may be implemented in software.

The illustrated architecture can process about 2,000 channels in approximately 64 microseconds, but that data rate is challenging for some Ethernet networks. An alternative arrangement is less demanding on the network connection. It includes an additional buffer or memory pool; this pool can be designated as working or standby. For example, an additional 8 frames worth of memory can be added per channel. This would allow buffering another eight frames while unloading the previously stored data. With double buffering, eight frames times or one full millisecond can be used to unload the inactive memory banks if necessary. The additional memory can be added within the BIC ASIC or SOC.

BIC Transmit Component Buffer Memory Operation

The BIC transmit module (1630) handles the transmit direction transfers, including data buffering and processor bus signaling. Data is sent from the transmit module in serial form, so this module takes parallel RAM bytes and serializes them for output on the TDM bus (1632). With reference again to FIG. 16A, the transmit module 1630 includes a parallel-to-serial converter 1631 coupled to provide TDM data bytes over the CHI bus 1632. In one illustrative configuration, this module 1630 contains five 128×16 RAM blocks per highway, i.e., 4 RAM blocks plus a spare. It can buffer up to 16 TDM highways 8 frames deep on a single board. Transmit voice data is written to this module 8 bytes at a time, from the network processor bus 1620, each byte containing a different frame (125 μsec sample) of the corresponding time slot. Of course, the arrangement can be varied, for example transferring anywhere from 2 to 16 bytes in one bus write cycle, depending on the network processor, processor bus size and speed, etc.

Figure 20:
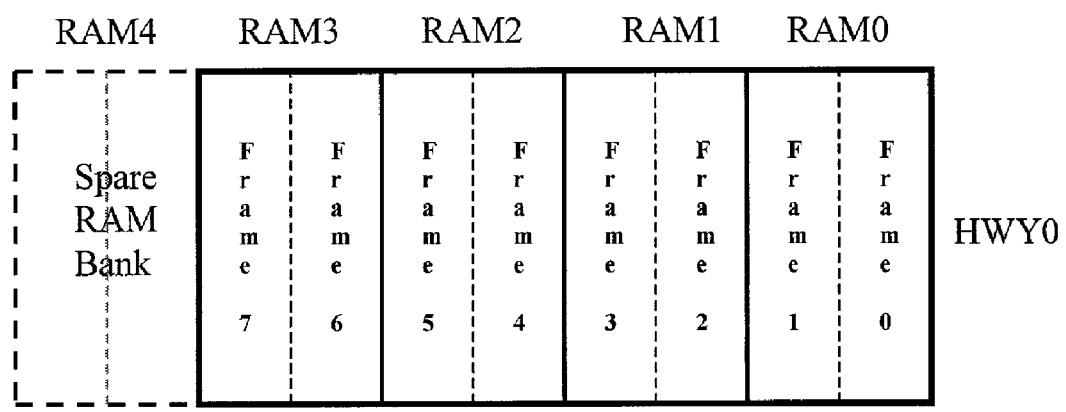
FIG. 20 illustrates an example of memory organization of the transmit buffer memory of the interface system of FIG. 15.

Referring now to FIG. 20, the transmit module RAM buffer is illustrated in one illustrative embodiment as RAM banks labeled "RAM0"–"RAM4". The five blocks of 128× 16 RAM are organized as shown in the figure with each bank storing two frames of data. When the transmit module is ready to receive data, it signals the network processor by setting the transmit ready flag. Following this flag, the IXP transmits data as described above. The transmit control module will store that data into the RAM structure of FIG. 20, selecting the "non-active" RAM banks for storage. The currently "active" bank is always reserved for unloading TDM data onto the local TDM bus. In FIG. 20, the active bank is shown as the "spare RAM bank." The active bank is constantly revolving, allowing 8 frames to be written to the transmit RAM, while protecting the bank that is currently unloading local TDM data. Preferably, the transmit control module can be independently enabled/disabled. For example, this can be implemented using the CSR (figure. While disabled, this module can be used to track time slots written from the IX bus, but frame counters will not increment and TDM data will not be written from BIC RAM to the TDM bus.

Figure 6A:
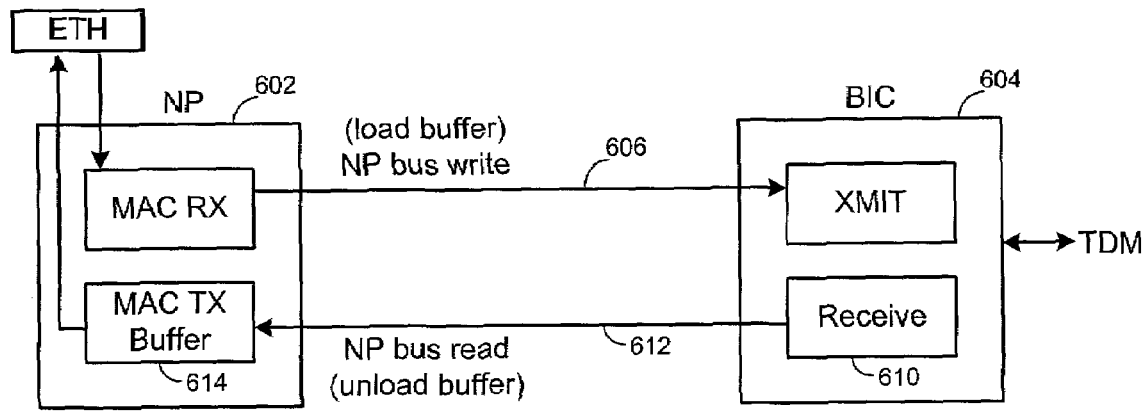
FIG. 6A is a simplified block diagram illustrating data flow between a network processor and a BIC in accordance with the present invention.

Basic data flow between the network processor and the BIC is summarized in the block diagram of FIG. 6A. FIG. 6A shows a network processor 602 coupled to a BIC 604. The network processor provides a MAC receive buffer, from which it writes data (606) to the BIC transmit memory. Conversely, the BIC implements a receive buffer (610) which is unloaded by a read operation (612) of the network processor (602). The network processor implements (internally or externally) a MAC transmit buffer 614 for connection to an Ethernet or other packet switched channel.

Network Processor Operation and Programming

Figure 7A:
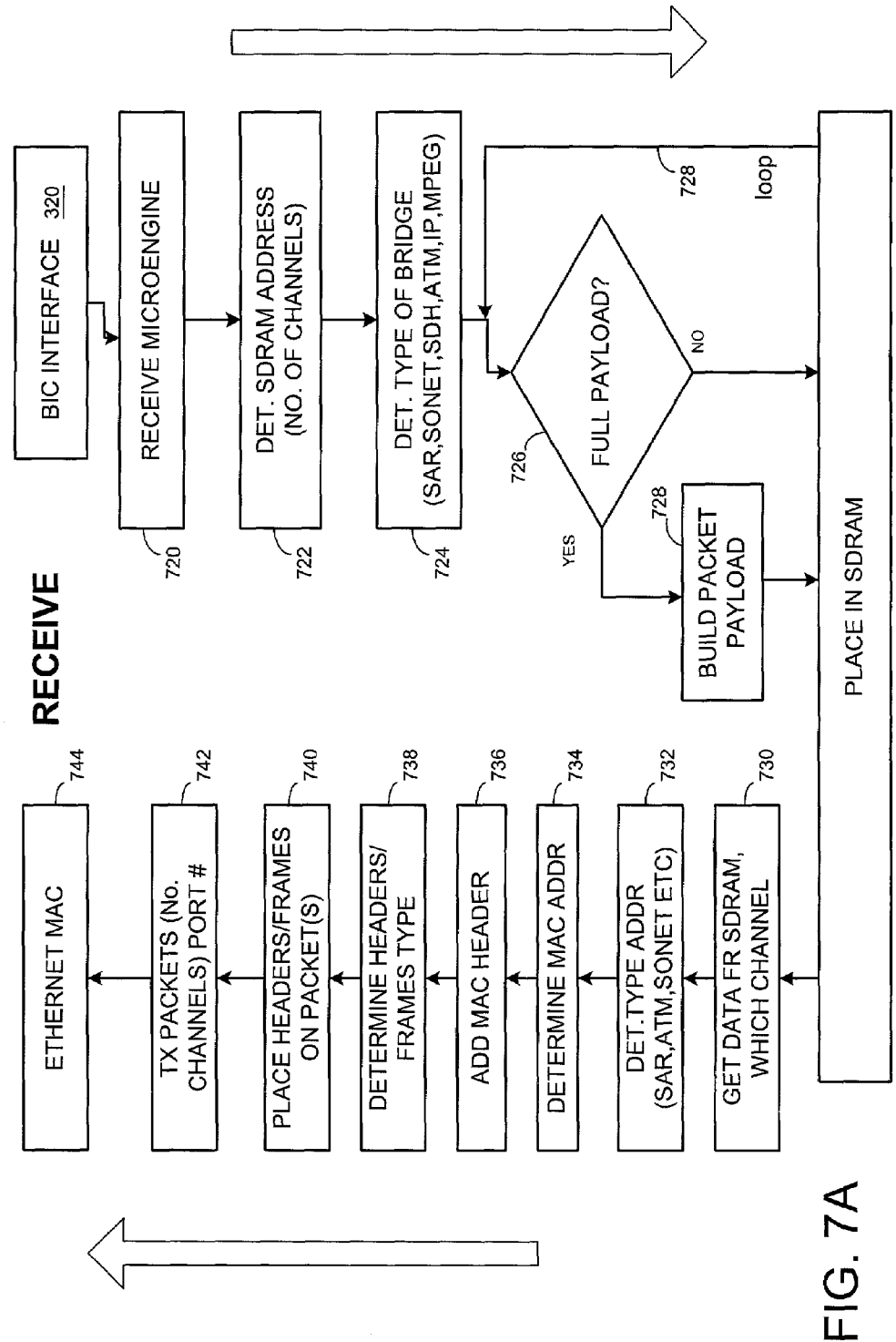
FIGS. 7A–7B illustrate operation of the network processor of FIG. 3.
Figure 7B:
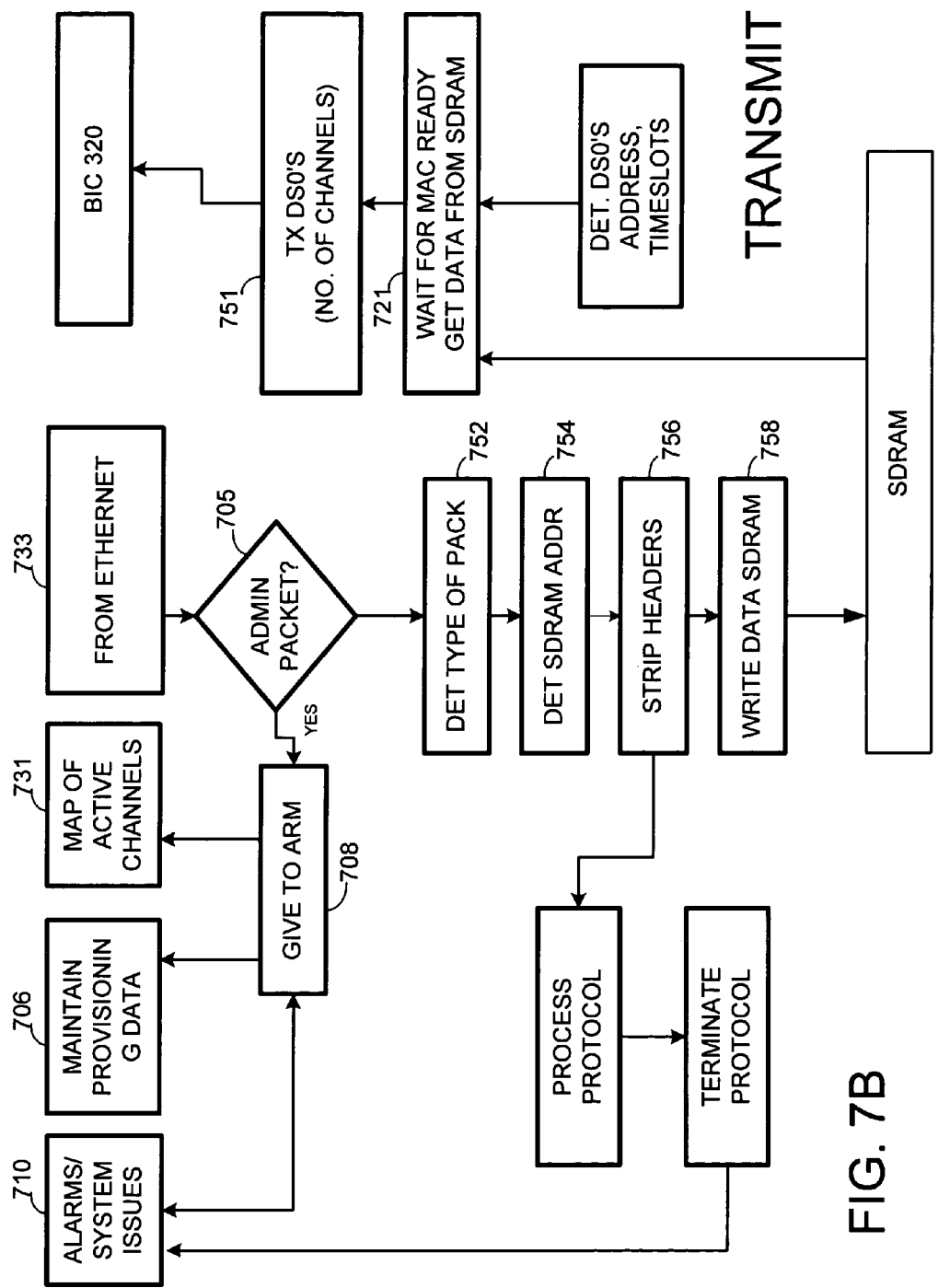

FIGS. 7A and 7B illustrate operation of a network processor in the context of the present invention. One example of a suitable network processor is the Intel IXB1200. This processor includes six integrated programmable, multi-threaded (four thread) microengines and a "Strong Arm"® RISC processor core. The IXB1200 interfaces to a maximum of 256 MB of SDRAM over a 64-bit data bus—(349) in FIG. 3, and a separate 32-bit SRAM bus (342) supports up to 8 MB of synchronous SRAM (344) and 8 MB of boot ROM (FLASH 325). The ROM and SDRAM can be used to program the device to operate generally as follows.

With regard first to FIG. 7B, packets received from the Ethernet MAC or other packet switched interface (733) are preliminarily inspected at (705) to detect an administrative (as distinguished from data) packet. Administrative packets are directed to the ARM® (RISC processor) (708) as it handles administrative and configuration tasks for the network processor. One of its tasks is to maintain active call tables (731) in memory. Thus, a packet may be received from a host processor with an instruction to set up (or tear down) a call connection. The ARM updates its map of active channels (731) accordingly. It also uses this information to dynamically provision the TSI as noted earlier; indicated generally in FIG. 7 A as maintaining provisioning data (706). Admin packets can also cause the processor to update system status or alarms (710). These and other communications with the host or system processor (not shown) can be conducted via a common microprocessor bus such as the PCI bus or via a local network. A serial connection (e.g. RS-232) can be provided for communication with the ARM for trouble-shooting and for development work in the absence of a host processor.

If the received packet is a data packet, the processor determines the type of packet (752). determines the appropriate SDRAM address (754), strips headers (756), and writes the data into the SDRAM (758).

With reference now to FIG. 7A, the receive operation is illustrated. Beginning at the upper right of the figure, the BIC interface (320) provides buffered data as described above and notifies the network processor when read data is ready. Recall that the processor must unload the entire receive buffer "inactive" memory in the time it takes to fill the available "active" memory with new data. In practical application, at least one or two frames of "extra memory" are provided for this purpose; allowing 250 microseconds in the latter example to execute 2K reads of the network processor bus. In a presently preferred commercial embodiment, a full complement—i.e. eight frames—of working memory is available to double buffer bus transfers.

At the network processor, each microengine has its own registers to receive data from the bus. And each of the microengines can execute four concurrent threads at core speed, currently on the order of 160–200 MHz. One thread can be assigned to receive data, say eight bytes, into its registers. A second thread can move the data into SDRAM. A third thread can build a packet, adding header information, etc. While that is happening, a second microengine can apply a first thread to receive data, a second thread for moving to SDRAM, and so on. Thus the microengines are interleaving fetches from the bus. This parallelism allows data to be processed and packets built very quickly. Additional microengines can similarly be assigned for receiving and analysing incoming packets, unpacking payload, and writing data to the bus concurrently.

By counting the incoming bytes (or based on memory address) the software determines whether or when a full payload is reached (726) for the indicated protocol. If a full payload is not yet received, it stores the current bytes in SDRAM and continues loops (728). When a full packet payload has been stored (728), it is processed as follows. Referring now to the lower left side of FIG. 7A, this process includes reading data from the SDRAM memory (730) at a pointer address corresponding to the current channel of interest; determining a type of addressing (732) (SAR, ATM, Sonet, SDH, Ethernet, etc.); determining a MAC address (734); adding a MAC header to the packet (736); determining the header or frames type (738) (Sonet, ATM, etc.); placing headers or frames on the packets in accordance with the designated type (740); and then transmitting the packets to an Ethernet MAC (742) or other indicated I/O port. Note that one microengine thread can be assigned to packet encapsulation, while another thread can handle interfacing with a MAC or other output channel. In this way, the data can be encapsulated in accordance with any of the wide variety of protocols, under software control, at very high speeds. Moreover, data or packets can be directed to various I/O ports as mentioned elsewhere.

Figure 6B:
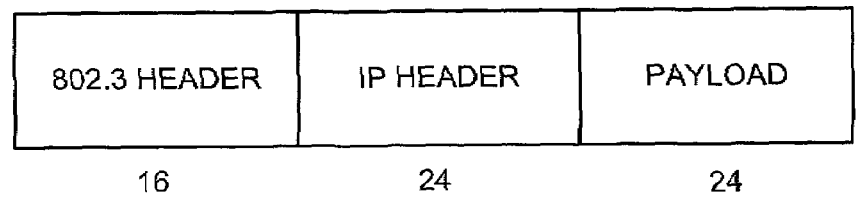
FIG. 6B illustrates one example of encapsulation of TDM data that can be implemented by the present invention in real time.
Figure 8:
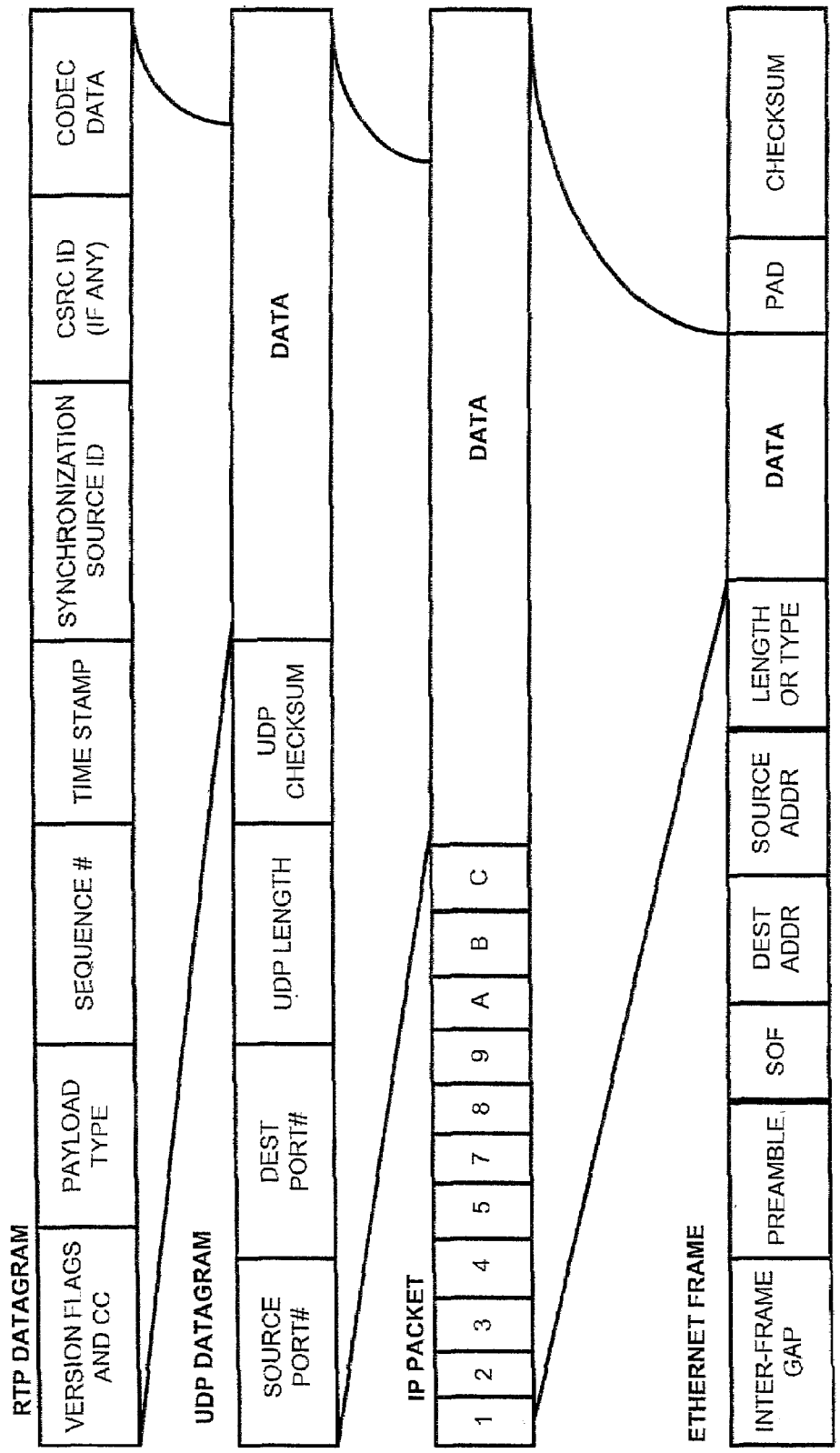
FIG. 8 is a diagram illustrating packetization of voice data packets employing the Internet Protocol within an Ethernet frame.

One example of an outgoing packet is shown in FIG. 6B—voice over IP over Ethernet encapsulation. FIG. 8 illustrates in greater detail the fields and a representative encapsulation hierarchy for carrying an RTP (real time transport protocol) datagram as payload in a UDP (user datagram protocol) over IP (Internet protocol) over an Ethernet physical frame. The various fields at each level are indicated in the drawings and are generally well known as they reflect IETF and other industry standards. The exception is the IP packet where space in the drawing did not permit listing the various fields; they are shown in the following Table:

TABLE 2

IP Packet Header Fields.

| NAME | FIELD | COMMENT | BITS |
|---|---|---|---|
| VERS | 1 | IP protocol version | 0–3 |
| HLEN | 2 | Header length (in 32-bit words)(typ. 5) | 4–7 |
| SERVICE TYPE | 3 | Precedence, delay, throughput, reliability | 8–15 |
| TOTAL LENGTH | 4 | total length datagram in octets (64k) . . . | 16–31 |
| IDENTIFICATION | 5 | ID number for identifying fragments | 32–47 |
| FLAGS | 5 | fragmentation control | 48–51 |
| FRAGMENT OFFSET | 6 | fragment offset from datagram header | (etc.) |
| TIME TO LIVE | 7 | maximum time of survival of datagram | |
| PROTOCOL | 8 | like type field in a network frame | |
| HEADER CHECKSUM | 9 | check integrity of header | |
| SOURCE IP ADDR | A | 32-bit IP address of sender | |
| DESTINATION IP ADDRESS | B | 32-bit IP address of intended recipient | |
| IP OPTIONS | C | optional; test and debug | |
| PADDING | D | to a defined minimum packet size | |
| DATA | — | aka payload | |

Referring once again to FIG. 16B, the cpu interface module of the BIC preferably implements several control and status registers, primarily to facilitate interaction with the network processor. These registers preferably include receive count (1660) and transmit count (1662) to allow network processor software to monitor the locations of the BIC buffer pointers. Overflow status bits (1664) and frame count (1666) provide status as the names imply. Packet length control registers, namely a receive packet length (1650) and transmit packet length (1652) registers allow the network processor bus accesses to and from the BIC to be of configurable length. This feature enables the software to ignore all highways and timeslots above a programmable level. A highway enable mask allows users to tri-state individual TDM input highways. Control register (1658) includes transmit and receive enables, for separately enabling the corresponding BIC components. A control/status register CSR (1668) includes a software reset bit to allow the software to reset the sytem to a defined power-up reset state. Of course, similar functionality can be implemented with various re-arrangements of the control and status registers. Non-data communications are conducted over the "slow port" bus or similar control channel depending on the particular processor.

Figure 9A:
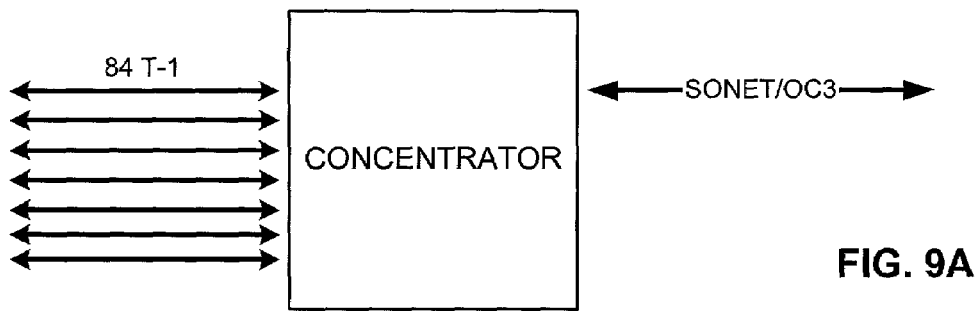
FIGS. 9A–9B illustrate applications of the architecture of the present invention to implement a concentrator and a TDM bridge, respectively.
Figure 9B:
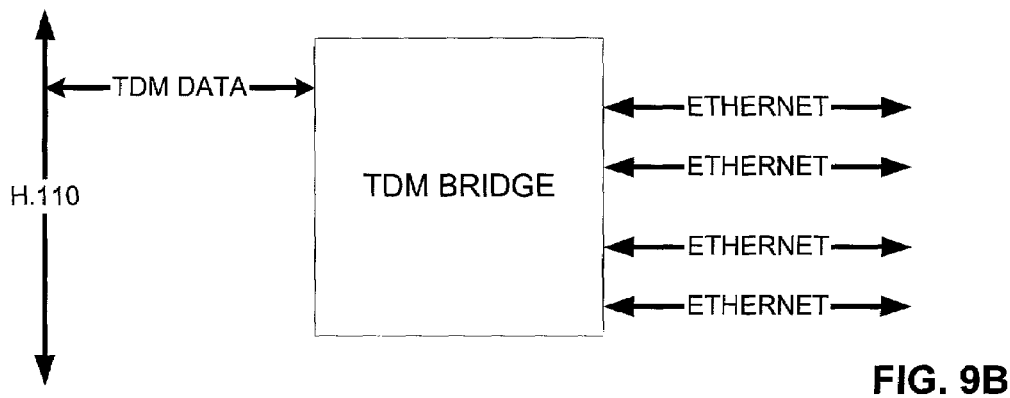
Figure 10A:
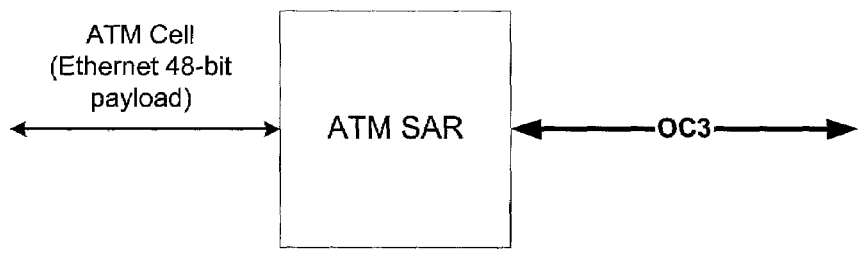
FIG. 10A–10B illustrate applications of the architecture of the present invention to implement an ATM SAR function and a TDM multiplexer, respectively.
Figure 10B:
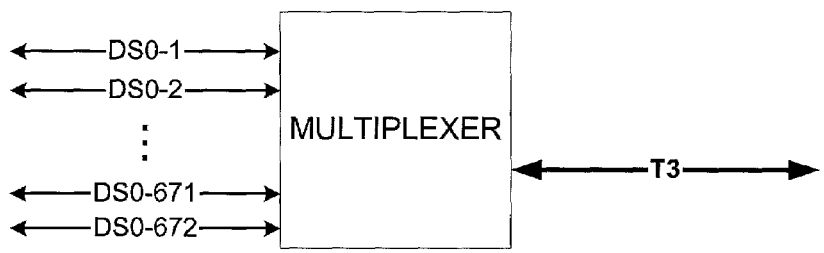
Figure 13:
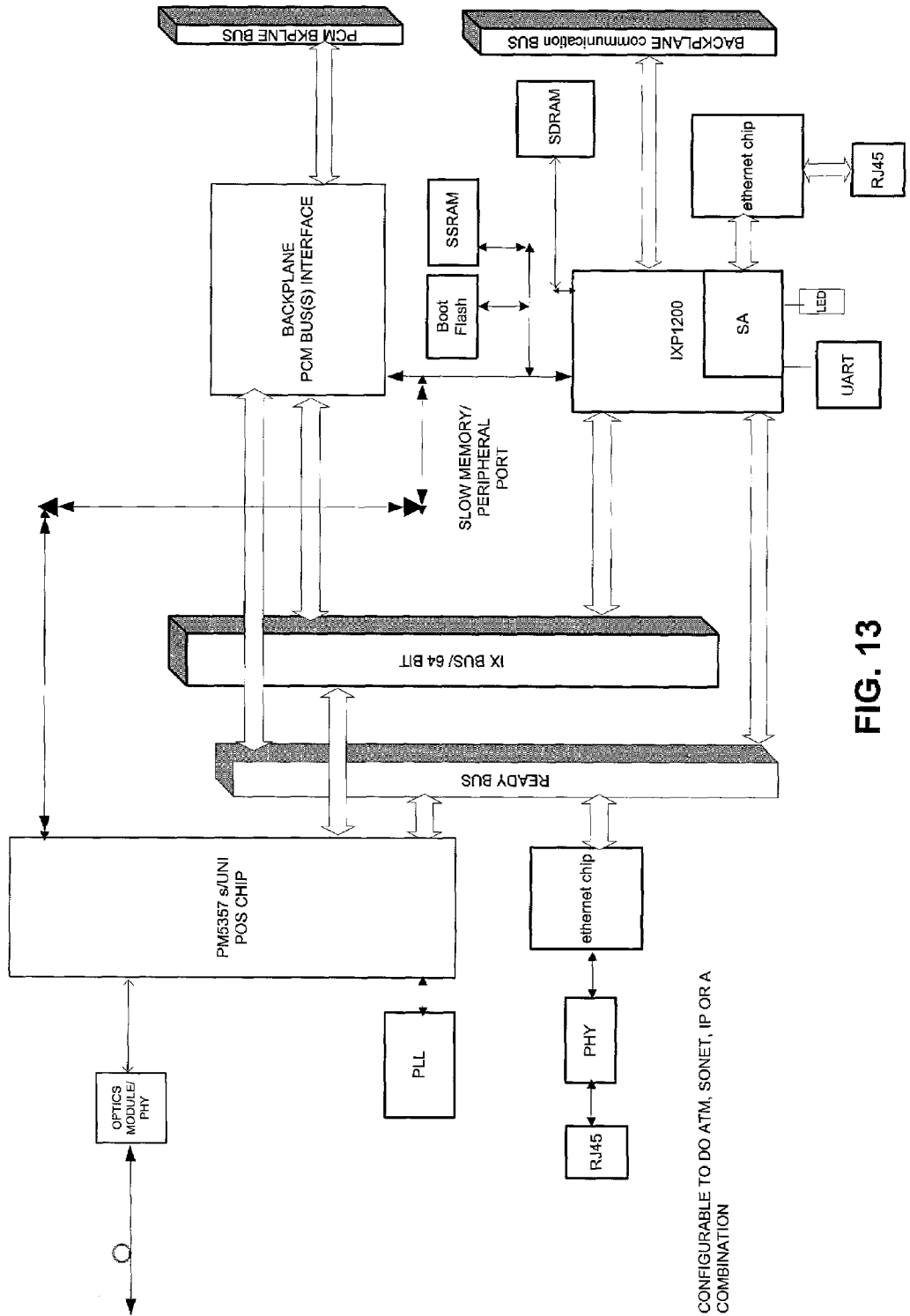
FIG. 13 is a block diagram of an alternative embodiment of the invention that is configurable to implement ATM, SONET, IP or a combination of protocols.

As the reader can now appreciate, the present architecture is highly scalable and flexible. FIG. 9A illustrates a concentrator application for concentrating some 84 T-1 lines (approximately 2,000 channels) into a single SONET/OC3 pipe. This implementation simply requires addition of a SONET/OC3 I/O port to the basic architecture, in addition or in lieu of the Ethernet ports. Software changes to the network processor can implement appropriate SONET protocols. For example, FIG. 13 shows a variation of the present architecture, employing an optical interface. This and other physical interfaces can be conveniently provided by PMC ("daughter cards") in a single-board embodiment of the invention. FIG. 9B shows a TDM bridge corresponding to the embodiment described above in detail; for processing TDM streams off the H.110 bus to four Ethernet ports (and the reverse direction). However, this application can be configured to skip IP encapsulation and carry TDM straight to Ethernet. FIG. 10A illustrates a SARing application, which can be used for example in the context of interfacing ATM to OC/3. This application, including implementation of AAL2, also can be implemented in software, using the same basic architecture as described above. FIG. 10B shows a multiplexer application in which some 672 DS0 channels can be switched to a T-3 connection under host/software control. The cable management problem of using e.g. 84 T-1 connections can be alleviated by multiplexing those up to three T-3 connections, requiring just three BNC cable connectors.

Figure 14:
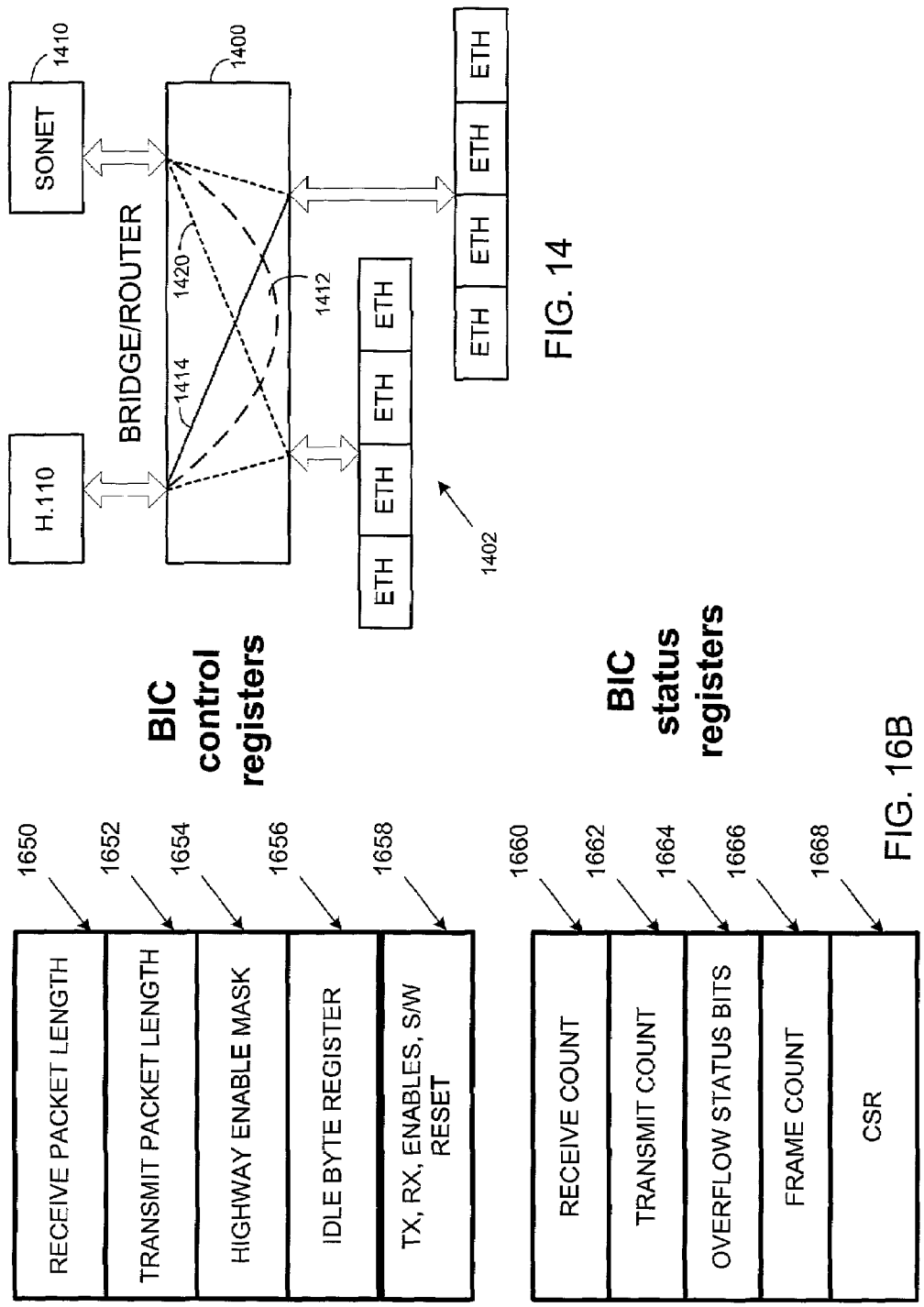
FIG. 14 illustrates an alternative configuration and application of the present invention.

FIG. 14 illustrates another configuration and application of the present invention. In FIG. 14, the TDM bridge system generally as described above is indicated as "bridge router" (1400). It is shown in this case configured with eight Ethernet connections (1402) to provide a total of up to 800 megabits of bandwidth. Bridge (1400) is coupled to an H.110 bus, as described above, for transmitting and receiving up to 2k full-duplex voice channels. An additional I/O port implements a SONET connection (1510). The SONET interface (commercially available) has capacity for approximately 4k timeslots, or 2k full-duplex connections, similar to the bandwidth of the H.110 bus—roughly equivalent to 84 T-1 connections. The network processor in this example is programmed to provision the TSI and the BIC to incorporate the additional SONET port. In this regard, the apparatus can serve as a bridge, concentrator or router. For example, TDM data can be forwarded to the SONET connection, as indicated by dashed line (1412). When the SONET buffer is full, additional calls can be routed from the H.110 bus to one or more of the Ethernet connections, as indicated by a dashed line (1414), and selected streams or calls can be routed to or from any of these three interfaces as may be required, for example, as indicated by dashed line (1420). These operations are somewhat similar to the function of an add/drop multiplexer. These features can be implemented in software using the methods and apparatus described above, together with additional memory to accommodate buffering the SONET interface. As a practical matter, the SONET interface can be conveniently added to a compact PCI board implementation through the PMC site.

It will be apparent to those having skill in the art that many changes may be made to the details of the above-described embodiment of this invention without departing from the underlying principles thereof. The scope of the present invention should, therefore, be determined only by the following claims.

We claim:

1. A buffered interface system for interfacing a continuous stream of serial TDM data to a network processor coupled to a parallel data bus, the interface system comprising:
    an input port for receiving at least one stream of serial TDM data, each data stream comprising a continuous series of time-domain multiplexed time slots synchronized to a common frame pulse signal, each time slot corresponding to a respective virtual channel for carrying digital voice content;
    a receive component coupled to the input port for buffering and assembling received TDM data so as to form bytes of parallel data; and
    a parallel bus interface coupled to the receive component for transferring said bytes of parallel data from the interface system to a network processor via a connected parallel data bus wherein:
    the receive component includes a serial-to-parallel converter for converting each time slot of the serial data stream into a corresponding byte of data,
    the receive component further includes a receive memory for storing said data bytes; the receive memory is organized so as to define at least two logical receive memory banks, and each of the receive memory banks is selectively configurable as either an active memory bank available for storing a series of said data bytes as provided by the serial-to-parallel converter, or as a non-active memory bank available for transferring previously stored data bytes to the parallel bus interface.

2. The interface system according to claim 1 wherein the receive component includes means for controlling the receive memory so as to store said incoming data bytes into an active one of the memory banks while concurrently transferring previously stored data bytes from the non-active memory banks to the parallel bus interface, thereby processing real-time TDM data flow at the input port with minimum delay.

3. The interface system according to claim 2 wherein said receive memory comprises N+1 blocks of random access memory, arranged to configure a selected one at a time of said memory blocks as an active memory block while the remaining N memory blocks are configure as non-active for concurrently transferring previously stored data bytes to the parallel bus interface, N being a positive, non-zero integer.

4. The interface system according to claim 3 wherein each memory block includes at least 128 bytes for storing data corresponding to one frame of TDM data.

5. The interface system according to claim 3 wherein each memory block includes 128 16-bit words selectable as upper and lower bytes for storing data corresponding to one frame of TDM data from each of two streams.

6. The interface system according to claim 1 wherein said receive memory includes means for concatenating bytes across multiple non-active memory banks so as to form a wide word for parallel transfer to the parallel bus interface.

7. The interface system according to claim 1 wherein said receive memory includes 9 blocks of random access memory, arranged to configure a selected one at a time of said memory blocks as an active memory block while the remaining 8 memory blocks are configure as non-active, and wherein said receive memory includes means for unloading and concatenating read bytes across the eight non-active memory banks so as to form an eight-byte wide word for broadside transfer to the parallel bus interface, said wide word comprising 8 bytes of data corresponding to a selected one of said time slots.

8. The interface system according to claim 1 including an integer multiple M pages of random access memory, each page of memory comprising a corresponding N+1 blocks of random access memory as recited, each page arranged for buffering and assembling an additional stream of TDM data provided to the input port.

9. An interface system for interfacing a network processor coupled to a parallel data bus so as to generate a continuous stream of serial TDM data, the interface system comprising:
    a parallel bus interface for connection to a parallel bus for receiving bytes of parallel data from a connected network processor;
    a transmit component coupled to the parallel bus interface for buffering and arranging the received bytes of parallel data so as to form the stream of serial TDM data; and
    a TDM output port for transmitting the stream of serial TDM data, the stream comprising a substantially continuous series of time-domain multiplexed time slots synchronized to a common frame pulse signal; wherein:
    the transmit component includes a transmit memory for storing said received data bytes;
    the transmit memory is organized so as to define at least two logical transmit memory banks, each transmit memory bank sized for storing a plurality of said data bytes for serialization into a frame of serial TDM data;
    each of the transmit memory banks is selectively configurable as either an active memory bank, available for unloading stored data bytes, or as a non-active memory bank available for storing data bytes as they are received from the parallel bus interface; and
    the transmit component includes a parallel-to-serial converter for converting each stored byte of data into a corresponding time slot to form the TDM data stream.

10. The interface system according to claim 9 wherein the transmit component includes logic for storing said received data bytes into the non-active memory banks while concurrently transferring previously stored data bytes from an active memory bank to the parallel-to-serial converter.

11. The interface system according to claim 10 wherein said transmit memory comprises N+1 blocks of random access memory, arranged to configure a selected N at a time of said memory blocks as non-active memory blocks while the remaining memory block is configured as active for concurrently transferring previously stored data bytes to the parallel-to-serial converter, N being a positive, non-zero integer.

12. The interface system according to claim 9 wherein:
    the parallel bus interface is coupled to the transmit memory for storing a multiple-byte data unit in a single, broadside write operation into multiple non-active memory banks, storing each data byte in a corresponding one of the non-active memory banks, so that a subsequent sequential read of a selected one of said memory banks produces a series of bytes corresponding to a frame of TDM data.

13. The interface system according to claim 12 and further comprising a cpu interface component including a control interface for control communication with a network processor; the control interface including at least one packet length register to allow network processor bus accesses of configurable length.

14. A system for interfacing a continuous stream of serial TDM data to a network processor coupled to a parallel data bus, the interface system comprising:
- an input port for receiving at least one input stream of serial TDM data, each input data stream comprising a continuous series of time-domain multiplexed time slots synchronized to a common frame pulse signal, each time slot corresponding to a respective virtual channel for carrying digital voice content;
- a receive component coupled to the input port an including a receive buffer memory for assembling received TDM input data so as to form first bytes of parallel data;
- an output port for transmitting at least one output stream of serial TDM data;
- a transmit component coupled to the output port and including a transmit buffer memory for disassembling the second bytes of parallel data so as to form the serial output TDM data; and
- a parallel bus interface, coupled to the receive component for transferring said first bytes of parallel data to a connected network processor, and coupled to the transmit component for concurrently transferring second bytes of parallel data from the connected network processor to the transmit component;
- and further comprising a cpu interface component including a control interface for control communication with a network processor;
- wherein the cpu interface module includes at least one status register for handshaking with the network processor.

15. The interface system according to claim 14 wherein the status registers include at least one of a Receive Count register, a Transmit Count register, and overflow status bits.

16. A system for interfacing a continuous stream of serial TDM data to a network processor coupled to a parallel data bus, the interface system comprising:
- an input port for receiving at least one input stream of serial TDM data, each input data stream comprising a continuous series of time-domain multiplexed time slots synchronized to a common frame pulse signal, each time slot corresponding to a respective virtual channel for carrying digital voice content;
- a receive component coupled to the input port an including a receive buffer memory for assembling received TDM input data so as to form first bytes of parallel data;
- an output port for transmitting at least one output stream of serial TDM data;
- a transmit component coupled to the output port and including a transmit buffer memory for disassembling the second bytes of parallel data so as to form the serial output TDM data; and
- a parallel bus interface, coupled to the receive component for transferring said first bytes of parallel data to a connected network processor, and coupled to the transmit component for concurrently transferring second bytes of parallel data from the connected network processor to the transmit component;
- and further comprising a cpu interface component including a control interface for control communication with a network processor;
- wherein the receive component includes logic for notifying the network processor when data in the buffer memory is ready for unloading.

17. A system for interfacing a continuous stream of serial TDM data to a network processor coupled to a parallel data bus, the interface system comprising:
- an input port for receiving at least one input stream of serial TDM data, each input data stream comprising a continuous series of time-domain multiplexed time slots synchronized to a common frame pulse signal, each time slot corresponding to a respective virtual channel for carrying digital voice content;
- a receive component coupled to the input port an including a receive buffer memory for assembling received TDM input data so as to form first bytes of parallel data;
- an output port for transmitting at least one output stream of serial TDM data;
- a transmit component coupled to the output port and including a transmit buffer memory for disassembling the second bytes of parallel data so as to form the serial output TDM data; and
- a parallel bus interface, coupled to the receive component for transferring said first bytes of parallel data to a connected network processor, and coupled to the transmit component for concurrently transferring second bytes of parallel data from the connected network processor to the transmit component;
- and further comprising a cpu interface component including a control interface for control communication with a network processor;
- wherein the receive component includes a standby buffer memory and logic for notifying the network processor when data in the buffer memory is ready for unloading; and further includes logic for storing data in the standby buffer memory while data in the buffer memory is unloading to the network processor.

18. A TDM bridge product comprising a circuit board configured for use in a host telecom system, the TDM bridge product comprising:
- a first input connector mounted on the circuit board for receiving TDM input data according to a predetermined protocol, the TDM data comprising at least one stream consisting of a continuous series of time-domain multiplexed time slots, each stream being synchronized to a common frame pulse signal, and each time slot corresponding to a respective virtual channel for carrying digital voice content;
- a time slot switch means mounted on the circuit board and coupled to the first input connector for controllably selecting at least one time slot of the TDM input data and providing the selected time slot of serial data to a local bus;
- a buffered interface component mounted on the circuit board and coupled to the local bus for receiving the selected TDM data and for forming wide data words, each wide data word including of a plurality of data bytes, and all of the data bytes within each wide data word corresponding to a selected time slot channel of the TDM input data;
- a network processor bus implemented on the circuit board and coupled to the interface component to receive the wide data words;
- a network processor mounted on the circuit board and coupled to the network processor bus for forming a series of data packets encapsulating the wide data words provided by the buffered interface component on the network processor bus; and an output connector mounted on the circuit board for transmitting the data packets on to a packet switched network coupled to the output connector.

19. The TDM bridge product according to claim 18 wherein the wide data words each include no more than 8 bytes, corresponding to 8 frames of TDM data or 1 millisecond of sampled voice content for each active time slot.

20. The TDM bridge according to claim 19 including means for transmitting the formed data packets on to an IEEE 802.3 network.

21. The TDM bridge according to claim 19 including means for transmitting the formed data packets on to an ATM network.

22. The TDM bridge according to claim 19 including means for transmitting the formed data packets on to a SONET network.

23. The TDM bridge according to claim 19 wherein the wide data word consists of a number of bits equal to a number of data signal lines of the network processor bus for transfer to the network processor in a single read operation.

24. The bridge product according to claim 18 wherein the series of data packets formed by the network processor are compliant with an internet protocol (IP).

25. The bridge product according to claim 18 wherein the series of data packets formed by the network processor are compliant with a SONET protocol.

26. The bridge product according to claim 18 wherein the product is configured to provide a concentrator application for concentrating multiple T-1 lines to a single SONET pipe.

27. The bridge product according to claim 18 wherein the product is configured to provide an ATM SARing application for interfacing ATM cells to a single SONET interface.

28. The bridge product according to claim 27 wherein the SONET interface carries at least an OC-3 level data rate.

29. A method of bridging TDM data to a packet switched network with minimal delay so as to obviate echo cancellation, the method comprising:
  receiving a stream of TDM data, the data stream comprising a continuous series of time-domain multiplexed time slots synchronized to a frame pulse signal, and each time slot corresponding to a respective virtual channel for carrying digital voice content;
  converting bits of the TDM stream into a corresponding byte on each time slot boundary, thereby forming a continuous series of bytes corresponding to the TDM stream;
  providing a plurality of N+1 memory banks, where N is a positive integer;
  storing a first frame of the series of bytes into a first one of the memory banks;
  storing each subsequent frame of the series of bytes into a next succeeding one of the memory banks, until N frames of data are stored in respective memory banks;
  storing a next subsequent frame of the series of bytes in the N+1th memory bank; and
  while storing said next subsequent frame of the series of bytes in the N+1th memory bank, concurrently unloading the first N frames of data from the first N memory banks into a processor;
  responsive to a next frame pulse signal, rotating the memory banks; and then
  repeating said steps of storing and unloading the series of data bytes in an ongoing fashion for continuous real-time operation; and
  concurrently, in the processor, encapsulating the wide words of data so as to form a series of data packets bearing the TDM data; and
  transmitting the series of data packets on to a packet switched network.

30. The method according to claim 29 wherein said unloading step includes:
  reading a first byte of each of N memory banks in parallel, thereby reading N bytes of a first time slot;
  concatenating all N bytes so as to form a wide word of the first time slot data;
  writing the wide word of data to a processor; and
  repeating said reading, concatenating and writing steps for each subsequent time slot in the stream.

31. The method according to claim 30 wherein each read step comprises reading a plurality of bytes of each of the N memory banks in parallel for simultaneous transfer to the processor.

* * * * *

UNITED STATES PATENT AND TRADEMARK OFFICE
CERTIFICATE OF CORRECTION

PATENT NO. : 7,042,892 B2
APPLICATION NO. : 09/872478
DATED : May 9, 2006
INVENTOR(S) : Valerie Jo Young et al.

It is certified that error appears in the above-identified patent and that said Letters Patent is hereby corrected as shown below:

In Column 3, Line 41, replace "banks" with --bank--.

In Column 10, Line 16, replace "BIG" with --BIC--.

In Column 10, Line 63, replace "duplexe" with --duplex--.

In Column 12, Line 4, after "read", insert --at --.

In Column 12, Line 9, replace "an" with --and--.

In Column 13, Line 24, replace "(figure." with --(FIG.16B).--.

In Column 14, Line 7, replace "." with --,--.

In Column 15, Line 46 replace "sytem" with --system--.

In Column 15, Line 57, after "addition", insert --to--.

In Column 17, Line 46, replace "configure" with --configured--.

In Column 17, Line 64, replace "configure" with --configured--.

UNITED STATES PATENT AND TRADEMARK OFFICE
CERTIFICATE OF CORRECTION

PATENT NO. : 7,042,892 B2
APPLICATION NO. : 09/872478
DATED : May 9, 2006
INVENTOR(S) : Valerie Jo Young et al.

It is certified that error appears in the above-identified patent and that said Letters Patent is hereby corrected as shown below:

In Column 19, Line 10, replace "an" with --and--.

In Column 19, Line 45, replace "an" with --and--.

In Column 20, Line 10, replace "an" with --and--.

In Column 20, Line 56, after "including", delete --of--.

Signed and Sealed this

Twenty-sixth Day of September, 2006

JON W. DUDAS
*Director of the United States Patent and Trademark Office*